(12) United States Patent
Lee et al.

(10) Patent No.: US 10,084,860 B2
(45) Date of Patent: Sep. 25, 2018

(54) DISTRIBUTED FILE SYSTEM USING TORUS NETWORK AND METHOD FOR CONFIGURING AND OPERATING DISTRIBUTED FILE SYSTEM USING TORUS NETWORK

(71) Applicant: Electronics and Telecommunications Research Institute, Daejeon (KR)

(72) Inventors: Sang-Min Lee, Daejeon (KR); Young-Kyun Kim, Daejeon (KR); Hong-Yeon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 274 days.

(21) Appl. No.: 15/010,373

(22) Filed: Jan. 29, 2016

(65) Prior Publication Data

US 2016/0301754 A1    Oct. 13, 2016

(30) Foreign Application Priority Data

Apr. 9, 2015 (KR) .................. 10-2015-0050020
Jan. 25, 2016 (KR) .................. 10-2016-0008755

(51) Int. Cl.
*H04L 29/08* (2006.01)
*H04L 12/24* (2006.01)
*G06F 17/30* (2006.01)

(52) U.S. Cl.
CPC .... *H04L 67/1097* (2013.01); *G06F 17/30067* (2013.01); *H04L 41/12* (2013.01); *H04L 41/5041* (2013.01)

(58) Field of Classification Search
CPC ............................. H04L 67/1097; H04L 41/12
See application file for complete search history.

(56) References Cited

U.S. PATENT DOCUMENTS 5,956,488 A * 9/1999 Suzuki ............... H04N 21/2326
                                                      348/E5.008
6,285,679 B1 * 9/2001 Dally ...................... H04L 45/00
                                                        370/413
(Continued)

FOREIGN PATENT DOCUMENTS

KR        10-1318426 B1    10/2013
KR     10-2014-0060959 A    5/2014
WO    WO-2015194937 A1 * 12/2015    ......... H04L 67/1097

OTHER PUBLICATIONS

Costa, Paolo; "Bridging the gap between applications and networks in data centers"; ACM SIGOPS Operating Systems Review; vol. 47 Issue 1, Jan. 2013.*

(Continued)

*Primary Examiner* — Jerry B Dennison
(74) *Attorney, Agent, or Firm* — William Park & Associates Ltd.

(57) ABSTRACT

Disclosed herein is a distributed file system using a torus network. The distributed file system may include multiple servers. The multiple servers are connected with each other through an n-dimensional torus network, and each of the multiple servers may be arranged along n-dimensional axes. Among the servers in the distributed file system, a server group of an (n−1)-dimensional torus network may be connected to a public network. Different loads of the distributed file system may be distributed based on the axes. Through the distribution, the processing performance of the distributed file system may be improved.

18 Claims, 27 Drawing Sheets

(56) References Cited

U.S. PATENT DOCUMENTS

| | | | | |
|---|---|---|---|---|
| 6,718,428 B2* | 4/2004 | Lee | ...................... | H04L 67/1097 |
| | | | | 709/213 |
| 7,673,011 B2* | 3/2010 | Archer | .................. | G06F 9/5061 |
| | | | | 709/213 |
| 8,850,163 B2* | 9/2014 | El-Essawy | .............. | H04L 45/06 |
| | | | | 712/12 |
| 9,178,784 B2* | 11/2015 | Ballew | .................. | G06F 9/5077 |
| 9,832,077 B2* | 11/2017 | Ballew | ................ | H04L 41/0893 |
| 2004/0078405 A1* | 4/2004 | Bhanot | ..................... | G06F 9/52 |
| | | | | 708/404 |
| 2009/0083277 A1* | 3/2009 | Barsness | ........... | G06F 17/30445 |
| 2012/0101991 A1 | 4/2012 | Srivas et al. | | |
| 2013/0282756 A1 | 10/2013 | Kim | | |
| 2014/0317056 A1 | 10/2014 | Kim | | |
| 2015/0242324 A1* | 8/2015 | Novakovic | ......... | G06F 12/0813 |
| | | | | 711/121 |
| 2016/0344618 A1* | 11/2016 | Oprea | ..................... | H04L 45/40 |

OTHER PUBLICATIONS

Ghemawat, S. et al., "The Google File System," 19th ACM Symposium on Operating Systems Principles, 15 pages (2003).
Hospodor, A. et al., "Interconnection Architectures for Petabyte-Scale High-Performance Storage Systems," 21th IEEE 12th NASA MSST, 9 pages (2004).

* cited by examiner

DISTRIBUTED FILE SYSTEM USING TORUS NETWORK AND METHOD FOR CONFIGURING AND OPERATING DISTRIBUTED FILE SYSTEM USING TORUS NETWORK

CROSS REFERENCE TO RELATED APPLICATIONS

This application claims the benefit of Korean Patent Application No. 10-2015-0050020, filed Apr. 9, 2015, and No. 10-2016-0008755, filed Jan. 25, 2016, which are hereby incorporated by reference in their entirety into this application.

BACKGROUND OF THE INVENTION

1. Technical Field

The following embodiments generally relate to a distributed file system and a method for configuring and operating the distributed file system. More particularly, the following embodiments relate to a distributed file system that uses a torus network and a method for configuring and operating the distributed file system that uses the torus network.

2. Description of the Related Art

The requirements for configuring a server cluster are as follows:

1) minimize the communication bottleneck between servers, and 2) guarantee the availability of a communication channel.

In order to satisfy these requirements, a conventional network configuration, for example, a fat-tree network topology comprising multiple levels of switches, may be used. However, when the conventional network configuration is used, network costs increase exponentially as the scale of the cluster increases.

In order to solve this problem, a method for communication between server nodes themselves, that is, a method for configuring a torus network using network interface cards (NIC) in servers, has been proposed.

This method may satisfy the above-mentioned requirements merely by adding NICs to servers without additional network construction costs even if the number of servers increases.

Meanwhile, a distributed file system comprises multiple data servers, as in the case of a server cluster. Here, the data servers operate as nodes for the distributed file system. Also, the distributed file system processes data service requests from a user through systematic cooperation between the data servers. Data service requests include requests for creating a file, searching for a file, reading data, writing data, and the like. However, similar to the above-mentioned problem of a server cluster, as the scale of the file system increases, network construction costs, required to connect servers in order to configure a large-scale data server cluster, sharply increase.

However, in solving the above-mentioned problem, a distributed file system may not be effectively configured using an existing torus network, unlike a simple server cluster. Accordingly, when a torus network is applied to a large-scale distributed file system, it is necessary to consider the following characteristics.

1) Data service requests are received from a public network, and the responses to the requests are also sent via the public network.

2) Generally, the frequency with which old data are accessed decreases with increasing time since the data were created.

3) User data accumulate with time.

4) Accessing some data has a high proportion of data service.

For the management of a distributed file system, a variety of research and development is in progress. For example, with regard to the management of a distributed file system, Korean Patent Application Publication No. 2014-0060959 is disclosed. Also, with regard to the operation of a torus network, Korean Patent No. 1318426 is proposed.

SUMMARY OF THE INVENTION

An embodiment may provide a method for configuring data servers in a torus network in consideration of the characteristics of a large-scale distributed file system.

An embodiment may provide a method for constructing a data server and adding data servers at the lowest network construction cost.

An embodiment may provide a method for arranging data servers in a torus network depending on whether priority is given to performance or a storage space.

An embodiment may provide a method for improving network efficiency using given resources by implementing a method for arranging data.

An embodiment may provide a method for improving network efficiency through a method for arranging data servers.

An embodiment may provide a method for rearranging workloads in multiple paths of a torus network.

An embodiment may provide a method for arranging loads on data servers in consideration of the characteristics of a torus network.

An embodiment may provide a distributed file system based on a torus network configured using the above-mentioned methods.

According to an aspect of the present invention, a distributed file system comprising multiple servers is provided, wherein the multiple servers are connected with each other through an n-dimensional torus network, and each of the multiple servers is arranged based on n-dimensional axes.

Here, n may be 3.

In configuring the distributed file system, a first configured server group of an (n−1)-dimensional torus network may be connected to a public network.

In configuring the distributed file system, a server group of the (n−1)-dimensional torus network may be sequentially connected to an existing configured network in a direction that is further from the public network.

When servers of an (n−1)-dimensional torus network are added in order to expand the distributed file system, the servers of the (n−1)-dimensional torus network may be arranged on a first axis of the axes and be arranged at a location that is closest to a public network on the first axis.

The first axis may be an axis corresponding to a distance from the public network.

When servers of an (n−1)-dimensional torus network are added in order to expand the distributed file system, the servers of the (n−1)-dimensional torus network may be arranged on a first axis of the axes and be arranged at a location that is farthest from a public network on the first axis.

Statistical information about the servers may be collected in an (n−1)-dimensional unit based on a first axis.

An (n−1)-dimensional master may collect the statistical information for each of (n−1)-dimensional networks on the first axis. An n-dimensional master may collect the collected statistical information about the (n−1)-dimensional networks.

Different loads of the distributed file system may be distributed based on the axes.

A data service load of the distributed file system may be distributed along a first axis among the axes.

The distributed file system may preferentially allocate a data space of a server that is closest to the public network among the servers in response to a request to allocate a data space for data service.

An internal load of the distributed file system may be distributed among remaining axes, excluding the first axis from the axes.

A data replication load of the distributed file system may be distributed along a second axis.

The second axis may be one of remaining axes, excluding the first axis from the axes.

The distributed file system may determine a server, in which a data space is to be allocated for replicating original data, using a turnaround method in a direction from a location close to a server that stores the original data to a location distant from the server that stores the original data, in response to a request to allocate a data space for data replication.

A striping load of the distributed file system may be distributed along a third axis.

The third axis may be one of remaining axes, excluding the first axis from the axes.

The distributed file system may allocate data spaces of multiple servers for striping.

The distributed file system selects a first server, in which a first data space of the data spaces is to be allocated, from among the servers.

The distributed file system may select a server, in which a remaining data space of the data spaces is to be allocated, from among the servers along the third axis in a direction from a location close to the first server to a location distant from the first server.

When multiple servers for storing striped data process a request to write data to be striped, each of the multiple servers for storing striped data may transfer a request to write remaining data, excluding data to be processed by each of the multiple servers, to a server subsequent thereto in response to the request to write data to be striped.

A last server of the multiple servers for storing striped data may generate a completion message when completing the request to write data to be striped.

The completion message may be transferred in a direction that is opposite to a direction in which the request to write data to be striped is transferred.

When multiple servers for storing striped data process a request to read striped data, each of the multiple servers may transfer the request to read striped data to a server subsequent thereto.

Data, read by the multiple servers in response to the request to read striped data, may be combined and transferred in a direction that is opposite to a direction in which the request to read striped data is transferred.

The distributed file system may adjust a location of predetermined data of the distributed file system on a first axis based on a frequency with which the predetermined data are accessed.

According to another aspect of the present invention, there is provided a method for configuring a distributed file system including: arranging each of multiple servers based on n-dimensional axes; and connecting the multiple servers with each other through an n-dimensional torus network.

According to a further aspect of the present invention, there may be provided a method for configuring a distributed file system that includes multiple servers connected with each other through an n-dimensional torus network, the method including: generating information about access to predetermined data of the distributed file system; and adjusting a location of the predetermined data on a first axis based on the information, wherein the first axis is an axis corresponding to a distance from a public network.

Additionally, there may be further provided a computer-readable storage medium storing a computer program for implementing the above-mentioned methods, other methods, devices, and systems.

BRIEF DESCRIPTION OF THE DRAWINGS

The above and other objects, features and advantages of the present invention will be more clearly understood from the following detailed description taken in conjunction with the accompanying drawings, in which:

FIG. 5A illustrates a distributed file system before the expansion according to an example;

FIG. 5B illustrates a distributed file system after the expansion according to an example;

FIG. 15A describes data to be striped, which are requested to be written, according to an example;

FIG. 15B describes writing data to be striped by servers according to an example;

FIG. 15C describes data transfer and response transfer in response to a request to write data to be striped according to an example;

FIG. 16A describes striped data requested to be read according to an example;

FIG. 16B describes reading striped data by servers according to an example;

FIG. 16C describes request transfer and data gathering in response to a request to read striped data according to an example;

FIG. 17A describes replicating data according to an example;

FIG. 17B describes transferring data to be replicated and transferring a response to a request to replicate data according to an example;

DESCRIPTION OF THE PREFERRED EMBODIMENTS

Figure 1:
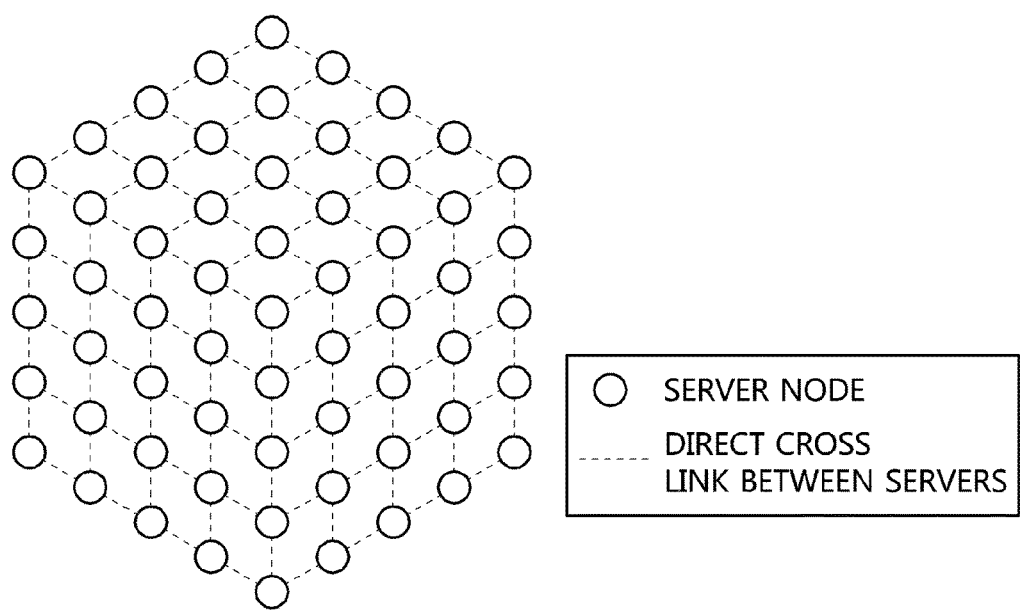
FIG. 1 illustrates the configuration of a 3-dimensional torus network according to an example.

Specific embodiments will be described in detail below with reference to the attached drawings. These embodiments are described in sufficient detail to enable those skilled in the art to practice the present invention. It should be understood that the embodiments differ from each other, but the embodiments do not need to be exclusive of each other. For example, a particular feature, structure, or characteristic described herein in connection with one embodiment may be implemented by another embodiment without departing from the sprit and scope of the present invention. Also, it should be understood that the location or arrangement of individual elements in the disclosed embodiments may be changed without departing from the spirit and scope of the present invention. Therefore, the following detailed description is not to be taken in a limiting sense, and if appropriately interpreted, the scope of the exemplary embodiments is limited only by the appended claims along with the full range of equivalents to which the claims are entitled.

The same reference numerals are used to designate the same or similar elements throughout the drawings. The shapes, sizes, etc. of components in the drawings may be exaggerated to make the description clear.

The terms used herein is for the purpose of describing particular embodiments only and is not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element, or intervening elements may be present.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Also, element modules described in the embodiments of the present invention are independently shown in order to indicate different characteristic functions, and it does not mean that each of the element modules is formed of a piece of separated hardware or a piece of software. That is, element modules are arranged and included, for convenience of description, and at least two of the element units may form one element unit or one element may be divided into multiple element units and the multiple element units may perform functions. An embodiment into which the elements are integrated or an embodiment from which some elements are separated is included in the scope of the present invention as long as it does not depart from the essence of the present invention.

Also, in the present invention, some elements are not essential elements for performing essential functions, but may be optional elements for improving only performance. The present invention may be implemented using only essential elements for implementing the essence of the present invention, excluding elements used to improve only performance, and a structure including only essential elements, excluding optional elements used only to improve performance, is included in the scope of the present invention.

Hereinafter, embodiments of the present invention are described with reference to the accompanying drawings in order to describe the present invention in detail so that those having ordinary knowledge in the technical field to which the present invention pertains can easily practice the present invention. In the following description of the present invention, detailed descriptions of known functions and configurations which are deemed to make the gist of the present invention obscure will be omitted.

Hereinafter, "the coordinates of a server" may be used as having the same meaning as "the address of a server". Here, "the coordinates of a server" or "the address of a server" may be used to specify a single server.

FIG. 1 illustrates the configuration of a 3-dimensional torus network according to an example.

In FIG. 1, a circle may represent a server or a server node. A line between circles may represent a connection between servers. The connection between servers may be a direct cross link.

In configuring a large-scale distributed file system, the following embodiments describe a method for constructing and adding servers at the lowest network construction cost by configuring or arranging the servers in a torus network in consideration of the characteristics of the large-scale distributed file system.

The method for constructing and adding servers according to an embodiment may satisfy network requirements at lower cost than a network based on conventional fat-tree topology. For example, the method for constructing and adding servers according to an embodiment may satisfy the network requirements without additional costs except for the costs of the added servers.

Also, the method for arranging servers in a torus network, proposed in the following embodiments, may reflect the requirements of users. For example, the requirements of users may include giving priority to performance, giving priority to storage space, or the like.

Also, the method for operating a torus network, proposed in the following embodiments, may provide data service requested by a user of a distributed file system optimally in consideration of the characteristic of the torus network.

Figure 2:
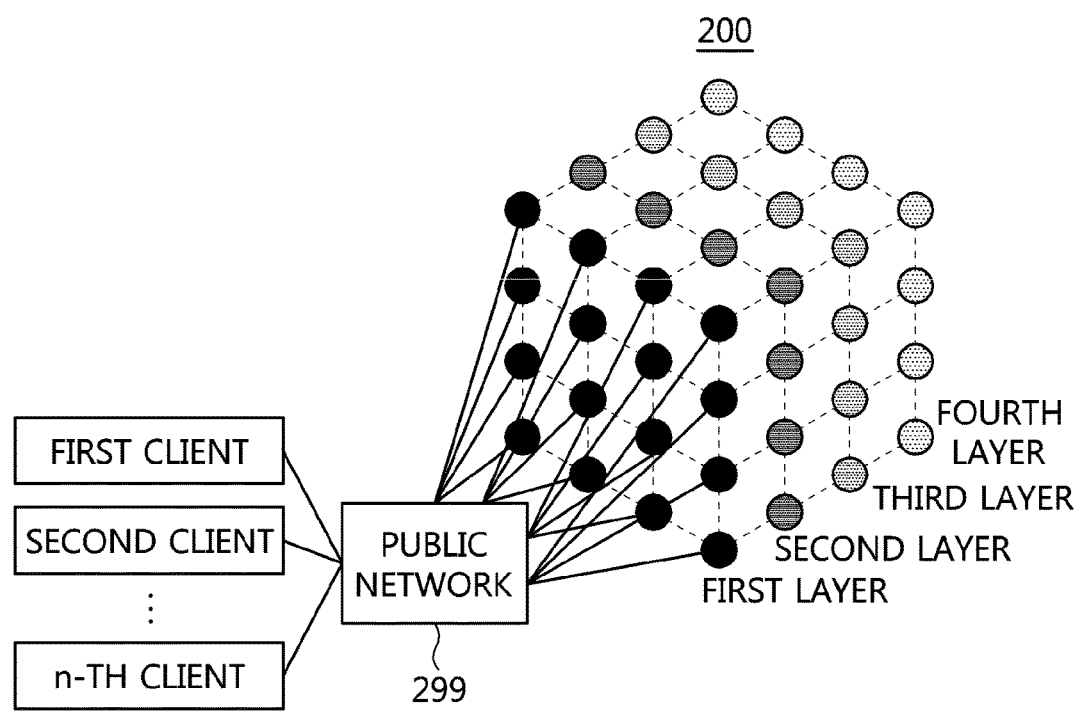
FIG. 2 shows a distributed file system based on a torus network according to an embodiment.

FIG. 2 illustrates a distributed file system based on a torus network according to an embodiment.

The distributed file system 200 may include multiple servers. Each of the multiple servers may be a data server.

In FIG. 2, each of the multiple servers is depicted as a circle. The multiple servers may be connected with each other through an n-dimensional torus network. Here, n may be an integer that is equal to or greater than 2.

In FIG. 2, a 3-dimensional torus network is illustrated. For example, n may be 3. Hereinafter, a distributed file system 200 may be described based on the 3-dimensional torus network. That is, the configuration, function, or operation described with regard to the 3-dimensional torus network may be regarded as the configuration, function, or operation of an n-dimensional torus network. Furthermore, the configuration, function, or operation described with regard to a 2-dimensional torus network may be regarded as the configuration, function, or operation of an (n−1)-dimensional torus network.

The multiple servers in the distributed file system 200 may form multiple layers. When the multiple servers in the distributed file system 200 are connected with each other through an n-dimensional torus network, each of the layers may comprise servers connected with each other through an (n−1)-dimensional torus network. In FIG. 2, the first layer, the second layer, the third layer, and the fourth layer are illustrated.

The distributed file system 200 may be connected to a public network 299. The public network 299 may be a fat-tree network.

A client may access the distributed file system 200 via the public network 299.

The client may comprise multiple clients. FIG. 2 illustrates the first client, the second client, and the m-th client, as the multiple clients.

When a large-scale distributed file system 200 is configured using a torus network, the following aspects may be considered in order to solve problems related to network construction costs.

First Consideration

Compared to a server cluster, a distributed file system 200 may require high bandwidth for a communication channel between a public network 299 and the distributed file system 200.

In other words, in terms of providing service to a user, the overall performance of the distributed file system 200 corresponds to the total bandwidth of the connection of servers to the public network 299, but the total storage space of the distributed file system 200 corresponds to the total storage space in all the servers connected through a torus network. Therefore, in consideration of this point, it is necessary to arrange servers in a torus network depending on whether priority is to be given to performance or storage space.

Second Consideration

Figure 3:
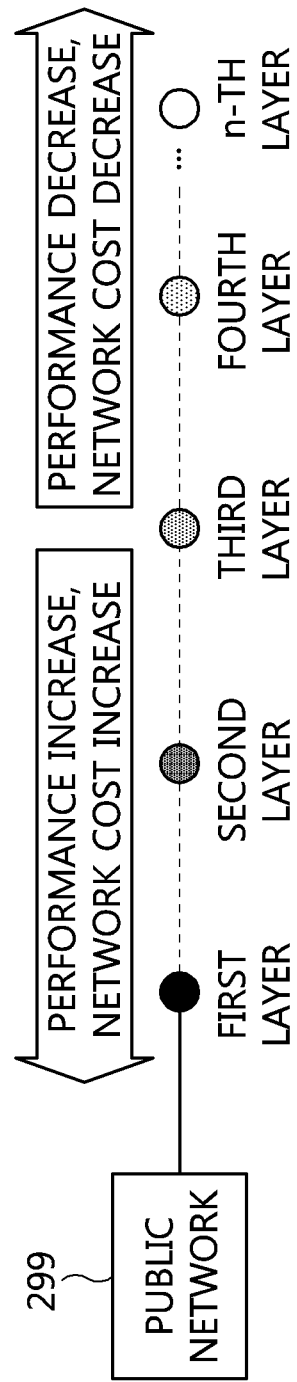
FIG. 3 shows performance and network costs depending on a layer according to an example.

FIG. 3 shows performance and network costs depending on the layer according to an example.

As illustrated in FIG. 3, a layer that is closer to a public network 299 has higher performance, but may incur higher network costs. Conversely, a layer that is further from the public network 299 has lower performance, but may incur lower network costs. In other words, in the case of a torus network formed by consecutively connected servers, when a server is closer to the public network 299, it has higher performance but incurs increased network costs. Also, in the torus network, when a server is further from the public network 299, it has lower performance but incur decreased network costs.

Therefore, in order to improve network efficiency using given network resources, a method for arranging data that are likely to be frequently accessed such that they are closer to the public network 299 may be used.

Third Consideration

Because of the characteristics of a large-scale distributed file system 200, the expansion of servers attributable to the increase of data is necessarily required. In a fat-tree network, such expansion may be easily achieved by simply adding servers, if the problem related to network costs is not considered. However, in a torus network, the following aspects may be further considered with regard to how to arrange a newly added network.

1) The arrangement may be changed according to the purpose of the expansion of servers. The purpose of the expansion of servers may be to improve performance or storage space.

2) In the case of old data, the frequency with which the data are accessed may decrease with increasing time since the data were created. In other words, the frequency with which recently created data are accessed may be high.

3) After a new server is arranged in a torus network, the data access performance may change depending on the location of the data. Therefore, under the condition in which user workloads dynamically change, the data may need to be rearranged.

Fourth Consideration

In an n-dimensional torus network, there may be n network paths. However, if workloads are concentrated on only some network paths, although there are n network paths, only some of the bandwidth of some network paths is used. Therefore, a method for appropriately distributing workloads into n network paths of the torus network is necessary.

Fifth Consideration

In a fat-tree network in which a network path is located, comprising for example server i, a switch, and server j, the network transfer costs of the servers are similar to each other.

However, in a torus network, the network transfer costs of servers may differ depending on the locations of the servers. For example, a network path in the torus network may be server i, server i+1, server i+2, . . . , and server j. Accordingly, data to be sent from server i to server j must pass through all of the servers between server i and server j.

When mutual communication between the multiple servers in a distributed file system 200 is required, loads must be distributed in consideration of the above-mentioned characteristics of a torus network.

Embodiments may provide a method for effectively configuring and processing a large-scale distributed file system 200 based on a torus network by reflecting the above mentioned considerations. This method enables performance that is similar to that of a fat-tree network at the low network construction cost of a torus network.

Figure 4:
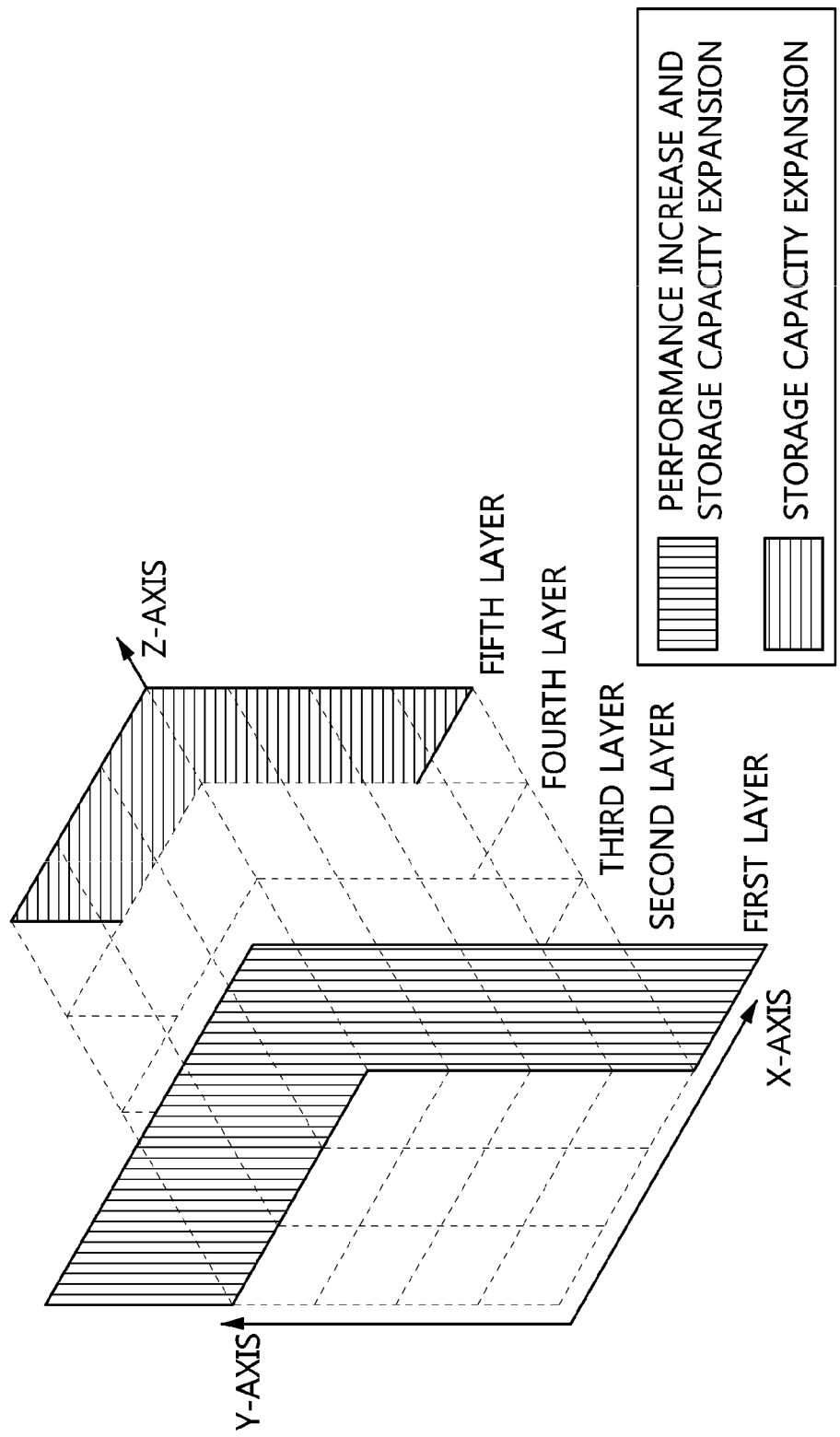
FIG. 4 illustrates a torus network of a distributed file system according to an embodiment.

FIG. 4 illustrates a torus network of a distributed file system according to an embodiment.

Each of the multiple servers in a distributed file system 200 may be arranged based on n-dimensional axes. For example, each of the multiple servers may have n-dimensional coordinates. Each coordinate may be an integer.

Alternatively, each coordinate may be an integer that is equal to or greater than 0, or an integer that is equal to or greater than 1.

Here, n may be 3. In FIG. 4, the multiple servers in the distributed file system 200 are arranged based on an X-axis, a Y-axis, and a Z-axis, which are 3-dimensional axes.

Among n-dimensional axes, the first axis may be an axis connected to a public network 299. The first axis may be an axis corresponding to the distance from the public network 299. Alternatively, the first axis may be an axis that denotes the distance from the public network 299. The coordinate of the first axis may denote the distance from the public network 299. For example, among the multiple servers in the distributed file system 200, a server of which the coordinate of the first axis has a specific value may be a server directly connected to the public network 299.

In FIG. 4, among 3-dimensional axes, the Z-axis is illustrated as the first axis. Among the multiple servers in the distributed file system 200, a server of which the Z-coordinate has a specific value may be a server directly connected to the public network 299.

In order to effectively construct a distributed file system 200, servers may be arranged in an n-dimensional torus network according to the intention of the user. Here, the intention of the user may be performance improvement or increasing storage capacity. Here, "performance" may mean capabilities for processing data service requests from a user.

As illustrated in FIG. 4, in the torus network of the distributed file system 200, if expansion is made in the first location on the Z-axis, which is connected to the public network 299, both storage capacity and performance may be increased with the number of servers added by the expansion.

Hereinafter, the first location on the Z-axis may mean the location of an X-Y plane that has the minimum Z value. Alternatively, the first location on the Z-axis may mean the location of the first layer.

The expansion in the first location on the Z-axis may mean the expansion of the X-Y plane that has the minimum Z value. Alternatively, the expansion in the first location on the Z-axis may mean the expansion of the first layer.

However, the expansion in the first location on the Z-axis may incur high network construction costs, as in the case of the expansion of a fat-tree network.

Also, as illustrated in FIG. 4, the torus network of the distributed file system 200 may be expanded in the direction of the Z-axis. When the torus network of the distributed file system 200 is expanded in the direction of the Z-axis, the storage capacity may be increased as much as the capacities of the servers added through expansion. The expansion of the torus network of the distributed file system 200 in the direction of the Z-axis may mean adding the X-Y plane that has the maximum Z value. Alternatively, the expansion of the torus network of the distributed file system 200 in the direction of the Z-axis may mean adding a layer that has the maximum Z value.

When the torus network of the distributed file system 200 is expanded in the direction of the Z-axis, a large-scale distributed file system 200 may be constructed without increasing network costs. However, if such expansion is made, when a server, the Z-coordinate of which is large, sends or receives user data, the data need to pass through the connection networks of the multiple layers in order to reach the first location of the Z-axis, connected to the public network 299. For example, the user data sent from a server in the fifth layer can be sent to the public network 299 only when the data sequentially pass through the fourth layer, the third layer, the second layer, and the first layer.

Accordingly, embodiments may provide a means for constructing a distributed file system 200 using an arrangement method predetermined according to user requirements and a data service type.

In a distributed file system 200, the expansion of servers is important. The reason is that it is difficult to estimate the usage of the distributed file system 200 when the system is introduced. Furthermore, if a large-scale distributed file system 200 is constructed from the beginning in anticipation of increased usage, a great cost is required for constructing the network and adding servers.

Also, in a network configuration such as an existing fat-tree network, the expansion of servers may be made in such a way that network infrastructure is expanded, and then added servers are connected to a network. The expansion of the network infrastructure also requires a high network construction cost.

When configuring a distributed file system 200, the following methods may be used.

In configuring a distributed file system 200, a first configured server group of an (n−1)-dimensional torus network may be connected to a public network 299.

Also, in configuring a distributed file system 200, a server group of an (n−1)-dimensional torus network may be sequentially connected to the existing configured network so as to be further from the public network 299.

Hereinafter, a method for the expansion of servers is described with reference to FIG. 4 and FIG. 5.

Figure 5A:
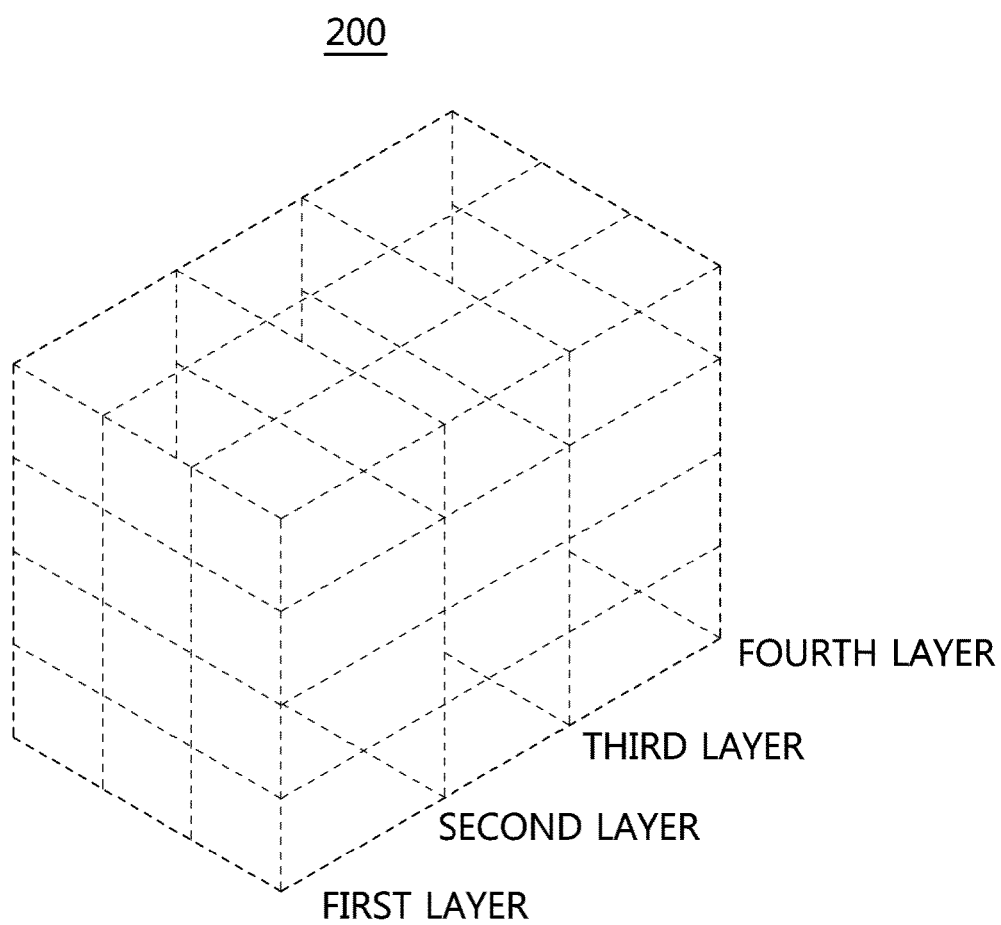
FIGS. 5A and 5B describe the expansion of servers of a distributed file system according to an embodiment.
Figure 5B:
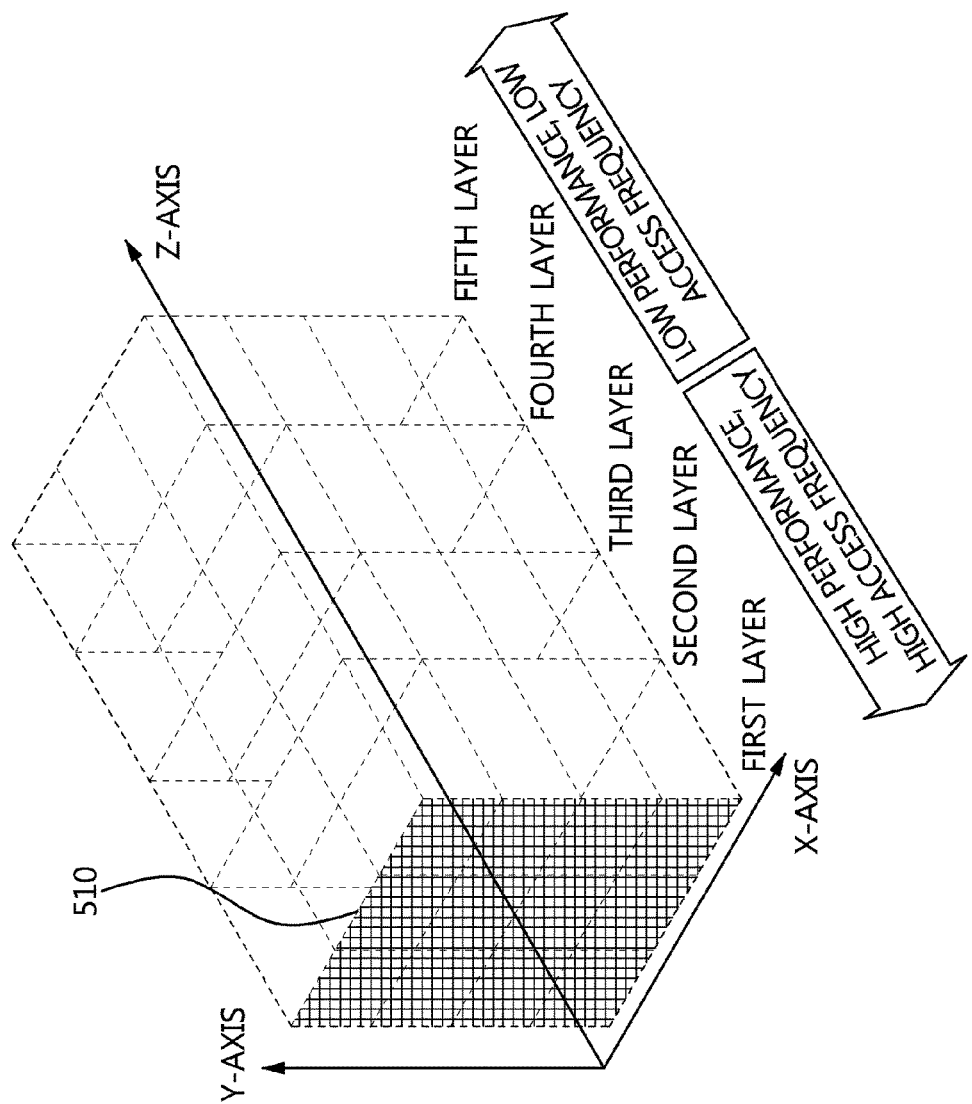

FIG. 5A and FIG. 5B describe the expansion of servers in a distributed file system according to an embodiment.

FIG. 5A illustrates a distributed file system before expansion according to an example.

In FIG. 5A, a distributed file system 200 based on a 3-dimensional torus network is illustrated.

FIG. 5B illustrates a distributed file system after expansion according to an example.

In FIG. 5B, a distributed file system 200 after expansion is illustrated.

In order to expand a distributed file system 200, a new server group 510 may be configured. The new server group 510 may be connected using a 2-dimensional torus network that has an X-axis and a Y-axis. The server group may include at least one server.

When the new server group 510 is configured, the server group may be connected to the distributed file system 200 based on the torus network, which has been constructed already. The new server group 510 may be connected to a preset location on the Z-axis. For example, the preset location may be the location that is closest to the public network 299.

When servers of the (n−1)-dimensional torus network are added in order to expand the distributed file system 200, the servers of the (n−1)-dimensional torus network may be arranged on the first axis, among the axes of the torus network. Also, the servers of the (n−1)-dimensional torus network may be arranged at a location that is closest to the public network 299 on the first axis.

The first axis may be the Z-axis. The first axis may be an axis corresponding to the distance from the public network 299.

The above-mentioned method may be a method that considers the characteristics of the torus network and the pattern of accessing user data.

In other words, the distributed file system 200 may arrange recently created data such that they are closer to the public network 299 than data created long ago. Also, frequently accessed data may be arranged so as to be closer to the public network 299, and may be accessed with high performance. Infrequently accessed data may be arranged to be further from the public network 299, and may be accessed with low performance.

Through this arrangement method, the distributed file system 200 may provide data service with performance that is similar to the performance available when all of the servers are connected to the public network 299.

Also, the new server group 510 may be added in another location. For example, when servers of the (n−1)-dimensional torus network are added in order to expand the distributed file system 200, the servers of the (n−1)-dimensional torus network may be arranged on the first axis, among the axes of the torus network. The servers of the (n−1)-dimensional torus network may be arranged at the location that is farthest from the public network 299 on the first axis.

Figure 6:
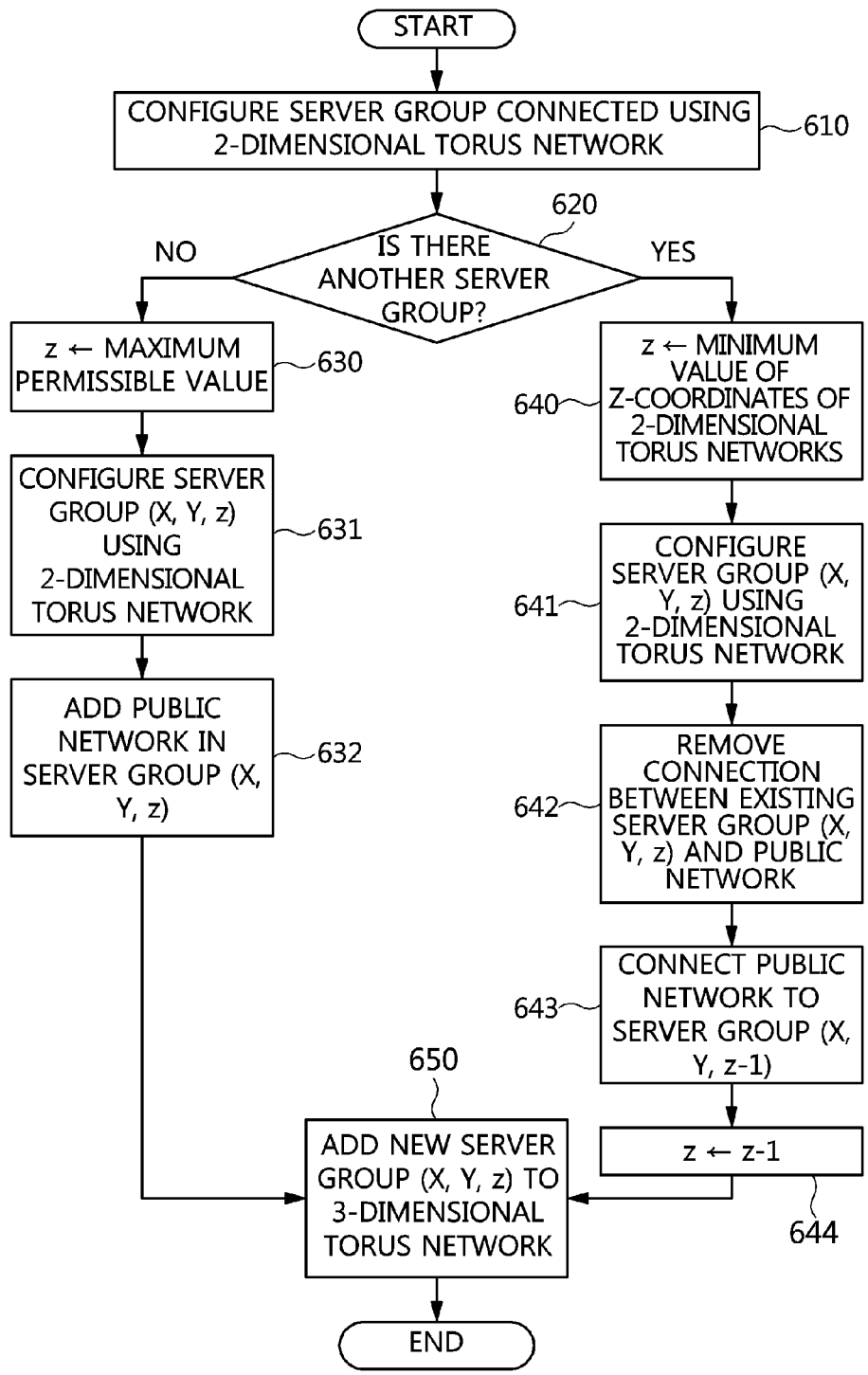
FIG. 6 is a flowchart of a method for adding a server group according to an example.

FIG. 6 is a flowchart of a method for adding a server group according to an example.

At step 610, the distributed file system 200 may configure a server group in which servers are connected using a 2-dimensional torus network. In the server group, servers may be connected using a 2-dimensional torus network, which has an X-axis and a Y-axis.

At step 620, the distributed file system 200 may check whether there is another server group in the existing 3-dimensional torus network. If there is no server group, step 630 may be performed. If there is another server group, step 640 may be performed.

For example, the distributed file system 200 may check whether there is a 2-dimensional torus network on the Z-axis. If there is no 2-dimensional torus network on the Z-axis, step 630 may be performed. If there is a 2-dimensional torus network on the Z-axis, step 640 may be performed.

At step 630, the distributed file system 200 may set the value of the variable z to the maximum permissible value for the Z-axis.

At step 631, the distributed file system 200 may configure a server group (X, Y, z). The server group (X, Y, z) may be a group of servers connected using the 2-dimensional torus network of which the Z-coordinate is z.

At step 632, the distributed file system 200 may add the public network 299 to the server group (X, Y, z). That is, the distributed file system 200 may connect the public network 299 to the server group (X, Y, z).

Meanwhile, at step 640, the distributed file system 200 may set the value of z to the minimum value of the Z-coordinates of the 2-dimensional torus networks that are connected to the Z-axis. The minimum coordinate value may be the Z-coordinate of the layer connected to the public network 299, among the layers of the distributed file system 200.

At step 641, the distributed file system 200 may configure a new server group (X, Y, z). The server group (X, Y, z) may be the group of servers connected using the 2-dimensional torus network of which the Z-coordinate is z.

At step 642, the distributed file system 200 may remove all the network connections between the server group (X, Y, z), which exists in the 3-dimensional torus network, and the public network 299.

At step 643, the distributed file system 200 may add the public network 299 to the server group (X, Y, z−1). That is, the distributed file system 200 may connect the public network 299 to the server group (X, Y, z−1).

At step 644, the distributed file system 200 may change the value of z to z−1.

At step 650, the distributed file system 200 may add the new server group (X, Y, z) to the 3-dimensional torus network of the distributed file system 200.

At steps 630, 631, 632, and 650, when there is no server group in the existing 3-dimensional torus network, the distributed file system 200 may set the Z-coordinate of the new server group to the maximum permissible value. The distributed file system 200 may connect the new server group to the 3-dimensional torus network, and may connect each of the servers in the server group to the public network 299.

At steps 640, 641, 642, 643, and 650, when there is another server group in the existing 3-dimensional torus network, the distributed file system 200 may search for the Z-coordinate that is closest to the public network 299, and may set the Z-coordinate of the new server group, in which servers are connected using the 2-dimensional torus network, to a value that is less than the found Z-coordinate. The distributed file system 200 may connect the new server group to the existing 3-dimensional torus network.

According to the above-mentioned method for adding a server group, as times passes, the server group may be rearranged so as to be further from the public network 299 in the direction of the Z-axis. Accordingly, data that are infrequently accessed by a user may be moved to a location in which the data input/output performance is low. Also, the distributed file system 200 arranges a new server, the storage space of which is empty, at the foremost position on the Z-axis, whereby new data, which are expected to be frequently accessed by a user, may be provided at the location in which the data input/output performance is highest.

Figure 7:
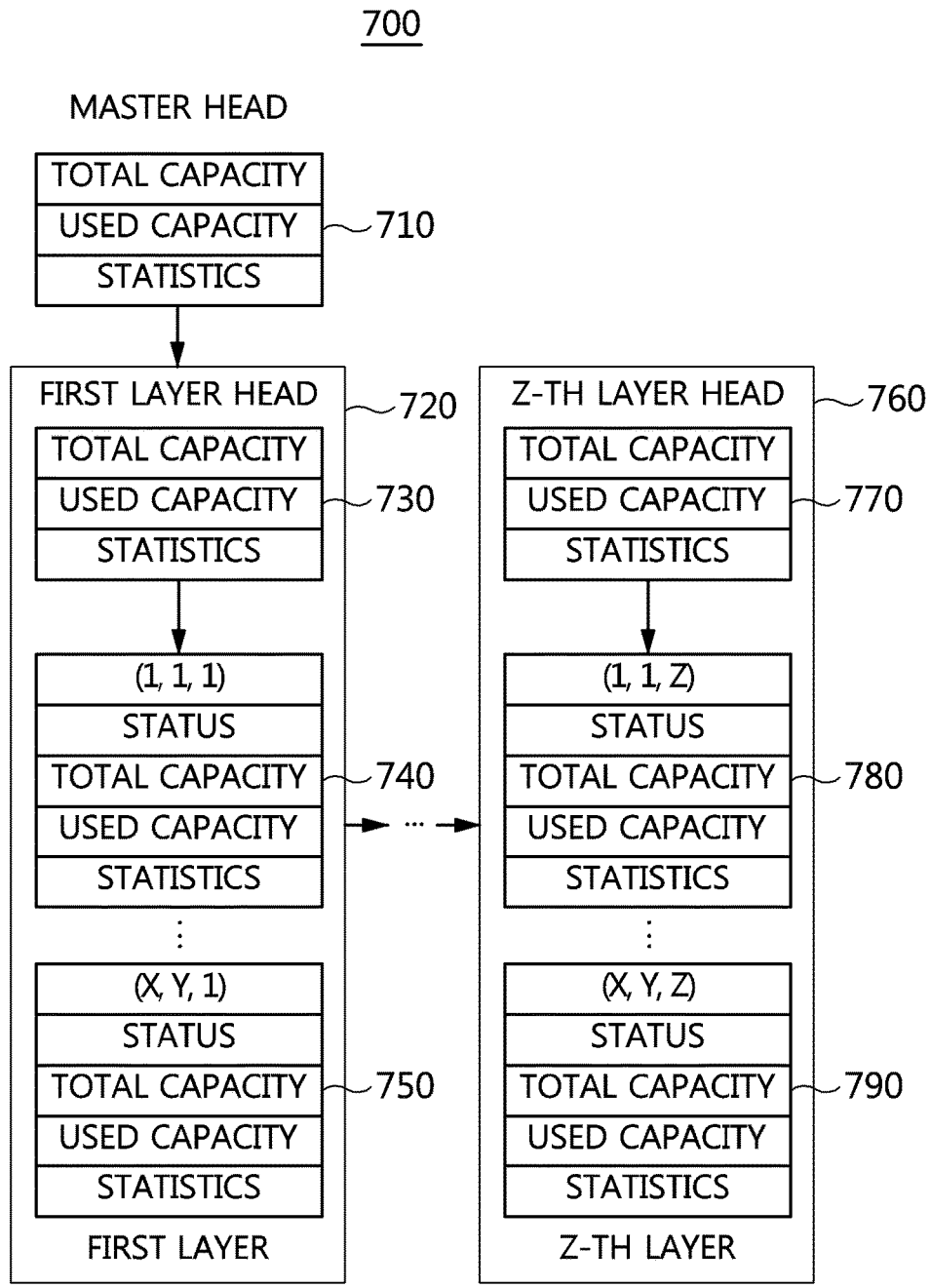
FIG. 7 shows a data structure for managing the status information about multiple servers in a 3-dimensional torus network.

FIG. 7 shows a data structure for managing the status information about the multiple servers in the 3-dimensional torus network.

In an embodiment, "status information" and "statistical information" may be used as having the same meaning, and they may be interchangeable with each other.

The status information 700 about the distributed file system 200 may include a master head 710.

The master head 710 presents information about the entire distributed file system 200. The master head 710 may include the total capacity of the entire distributed file system 200, the capacity of the entire distributed file system 200 that is being used, and statistics about the entire distributed file system 200.

Using the master head, the status information and statistical information about the multiple servers connected in the 3-dimensional torus network may be managed.

All of the servers of the distributed file system 200 may be categorized into 2-dimensional groups based on the Z-axis. Each of the groups may be regarded as a layer. The status information 700 about the distributed file system 200 may include the status information about each of the layers of the distributed file system 200.

In FIG. 7, the status information 720 about the first layer and the status information 760 about the Z-th layer are illustrated.

The status information about a layer may include a layer head. In FIG. 7, the first layer head 730, included in the status information 720 about the first layer, and the Z-th layer head 770, included in the status information 760 about the Z-th layer, are illustrated.

Using the status information about a layer, the status information and statistical information about a server group, in which servers are connected using a 2-dimensional torus network, may be managed.

The master head 710 and the pieces of status information about the layers may be sequentially connected using a linked list or the like. For example, the master head 710 may point to the status information 720 about the first layer or the first layer head 730 of the first layer. Each of the layers may consecutively point to the layer head of the next layer, and this consecutive link may continue to the last layer.

The distributed file system 200 may manage the pieces of status information about the layers using the sequential link. The distributed file system 200 may update the information in the master head 710 by combining the pieces of status information about the layers.

A layer head may include the total capacity of a layer, the used capacity of the layer, and the statistics of the layer.

The status information about each of the layers may include the status information about each of the servers included in the corresponding layer. Referring to FIG. 7, the status information 740 about the server (1, 1, 1) and the status information 750 about the server (X, Y, 1) are included in the status information 720 about the first layer. Here, the server (1, 1, 1) and the server (X, Y, 1) are included in the first layer. Also, the status information 780 about the server (1, 1, Z) and the status information 790 about the server (X, Y, Z) are included in the status information 760 about the Z-th layer. Here, the server (1, 1, Z), and the server (X, Y, Z) are included in the Z-th layer.

The status information about a server may include the status of the server, the total capacity of the server, the used capacity of the server, and the statistics of the server.

The layer head and the pieces of status information about the servers included in the layer may be sequentially connected using a linked list or the like. For example, the first layer head 730 may point to the status information 740 about the server (1, 1, 1). The status information about each of the servers may consecutively point to the status information about the next server. These consecutive links may continue to the status information about the last server.

The distributed file system 200 may manage the pieces of status information about the servers using the sequential links. The distributed file system 200 may update the information in the layer head by combining the pieces of status information about the servers.

Figure 8:
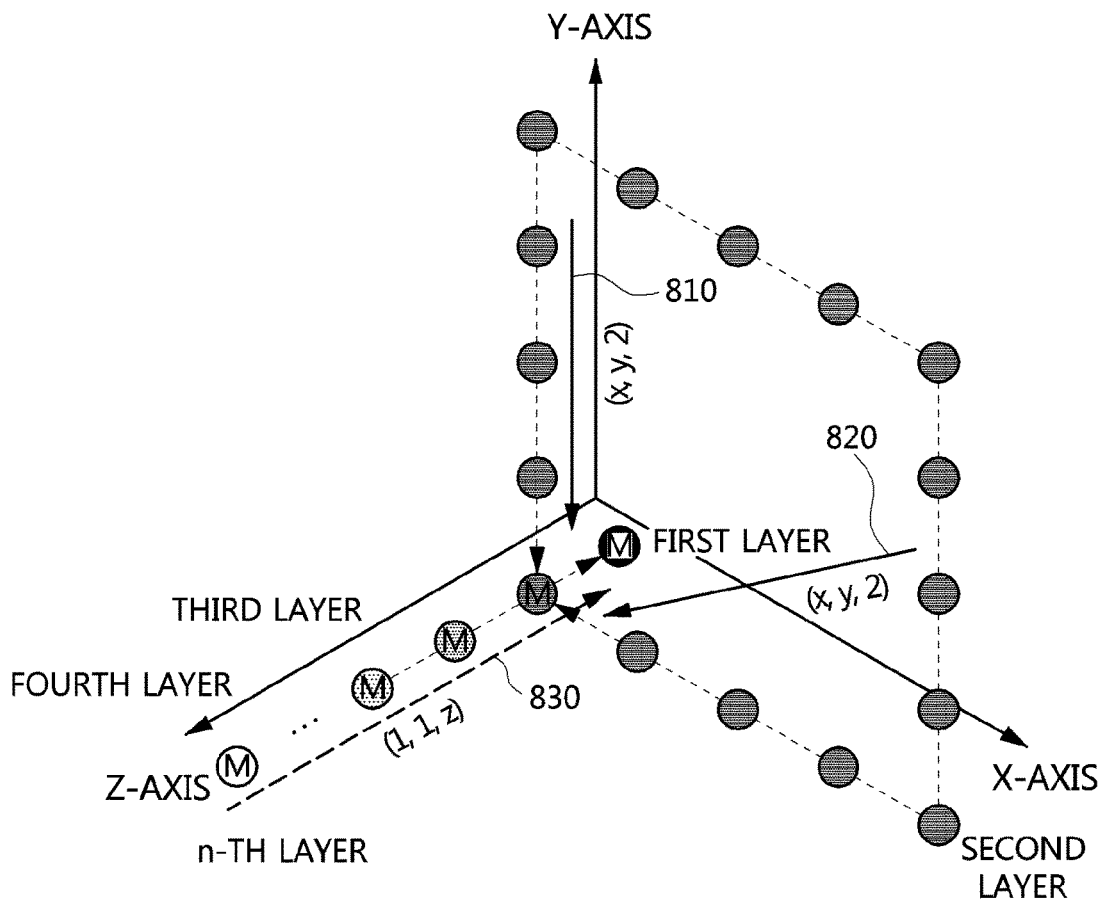
FIG. 8 shows the configuration for collecting the status information about multiple servers in a 3-dimensional torus network according to an example.

FIG. 8 shows the configuration for collecting the pieces of status information about the multiple servers connected in the 3-dimensional torus network according to an example.

In an embodiment, "status information" and "statistical information" may be used as having the same meaning, and they may be interchangeable with each other.

In order to collect the pieces of status information about all of the servers, the distributed file system 200 may categorize all of the servers into 2-dimensional groups based on the Z-axis. Each of the groups may be regarded as a layer.

The distributed file system 200 may select a layer master for each of the groups. The layer master may be a 2-dimensional master, and may be a group master.

The layer master may be a server selected from among the servers in a group according to a preset condition. Alternatively, the layer master may be a server in a preset location, among the servers of a group. For example, the layer master may be the server of which the coordinates are (1, 1, z), among the servers in the group for which the Z-coordinate is z.

The layer master may collect the pieces of status information about all of the servers in the group, and may determine the status information about the layer using the collected pieces of status information about the servers.

In FIG. 8, the flows 810 and 820 of the status information about servers, for generating the status information about the layer, are illustrated.

The distributed file system 200 may select an overall master from among the multiple servers in the distributed file system 200. The overall master may be a 3-dimensional master, and may be the master of the torus network.

The overall master may be a server selected from among the multiple servers in the distributed file system 200 according to some preset conditions. Alternatively, the overall master may be a server in a preset location, among the multiple servers in the distributed file system 200. For example, the overall master may be a server of which the coordinates are (1, 1, MIN(Z)), among the multiple servers in the distributed file system 200. Here, MIN(Z) may be the minimum value of the Z-coordinates of the multiple servers in the distributed file system 200 or the minimum value of the Z-coordinates of the servers on the Z-axis. Alternatively, MIN(Z) may be the Z-coordinate of the server that is farthest from the public network 299, among the multiple servers in the distributed file system 200. That is, the overall master may be the master of the layer that is farthest from the public network 299, among the layer masters.

The status information about the layers, collected by layer masters, may be sent to the overall master. The overall master may generate status information about the distributed file system 200 using the received status information about the layers.

The pieces of statistical information about the multiple servers in the distributed file system 200 may be collected in (n−1)-dimensional units, based on the first axis, by the layer masters. Here, n may denote the number of dimensions of the torus network of the distributed file system 200. The first axis may be the Z-axis. Also, the first axis may be an axis corresponding to the distance from the public network 299.

For each of the (n−1)-dimensional networks on the first axis, the (n−1)-dimensional master may collect the pieces of statistical information. Also, the n-dimensional master may collect the collected statistical information about the (n−1)-dimensional networks. Here, the (n−1)-dimensional master may be the above-mentioned layer master. Also, the n-dimensional master may be the above-mentioned overall master.

FIG. 8 illustrates the flow 830 of the status information about a layer, for generating the status information about the distributed file system 200.

As described above, the pieces of status information about servers are collected for each layer by a layer master. Then, the pieces of status information collected for layers are combined by the overall master. The reasons why the sequential combination must be used are as follows:

1) The status information may be collected via the shortest transfer distance according to the characteristic of a torus network. Here, the characteristic of the torus network may be that data sent from one server to another server are required to pass through an intermediate server or servers, located between the two servers.

2) In order to calculate torus network placement awareness, the statistics for each layer are necessarily required. In order to collect status information that is necessary for the statistics for each layer, it is most efficient to use a method in which the multiple servers in the distributed file system 200 are categorized into 2-dimensional groups, a layer master is selected for each of the groups, and the layer master collects the pieces of status information about the servers in the group.

Figure 9:
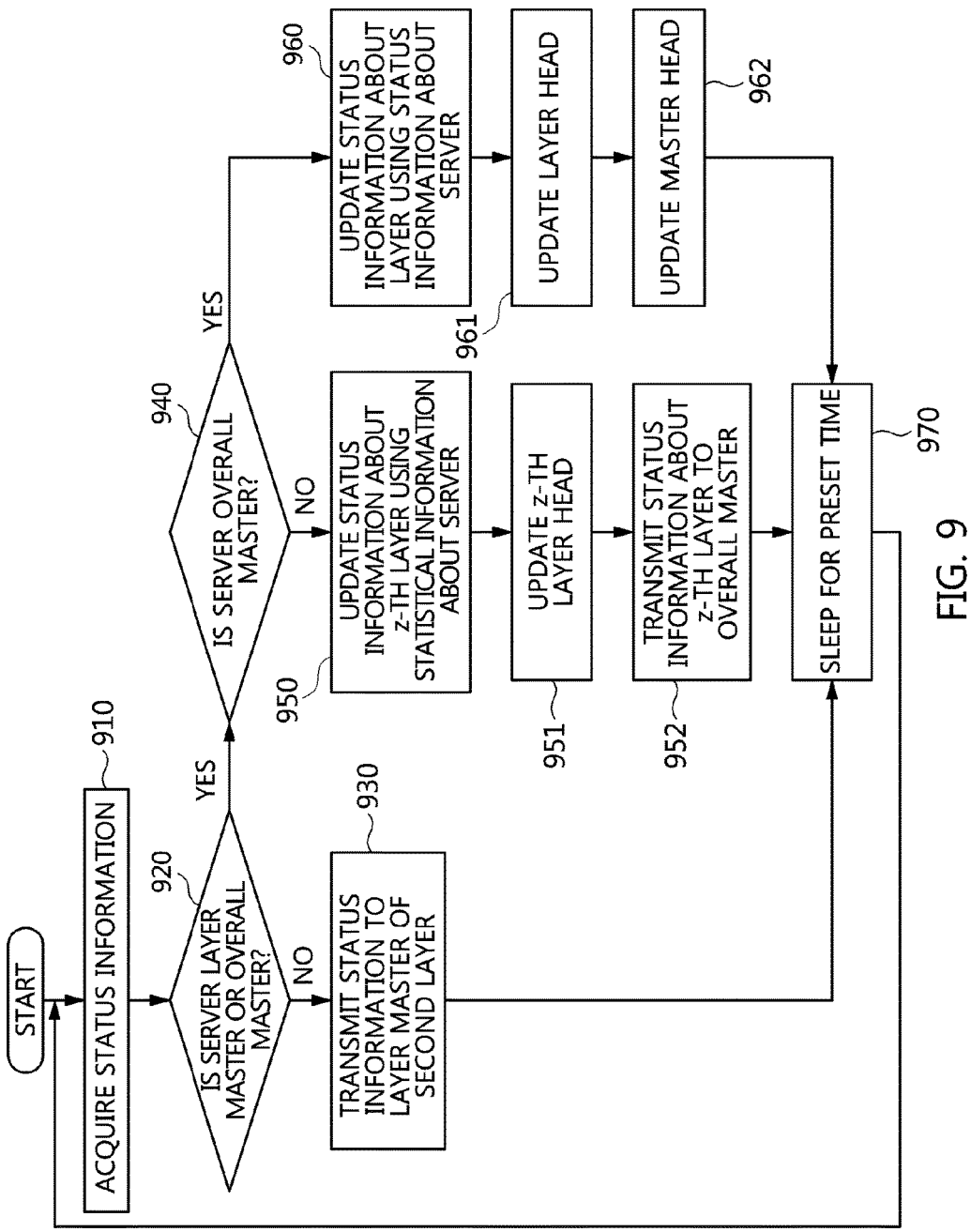
FIG. 9 is a flowchart of a method for sending the status information about a server according to an example.

FIG. 9 is a flowchart of a method for sending the status information about a server according to an example.

In an embodiment, "status information" and "statistical information" may be used as having the same meaning, and they may be interchangeable with each other.

In FIG. 9, the method for sending the status information may be performed by each of the multiple servers in the distributed file system 200.

Hereinafter, the method for sending the status information about the server (x, y, z) is described. The server (x, y, z) may be a server of which the X-coordinate, Y-coordinate, and Z-coordinate are respectively x, y, and z.

At step 910, the server (x, y, z) may collect its own status information.

The status information may include the disk information and system information about the server (x, y, z).

At step 920, the server (x, y, z) may check whether the server (x, y, z) itself is a layer master or an overall master.

For example, the server (x, y, z) may determine that the server (x, y, z) itself is a layer master or an overall master if both the X-coordinate and the Y-coordinate are 1. Conversely, if any one of the X-coordinate and the Y-coordinate is not 1, the server (x, y, z) may determine that the server(x, y, z) itself is neither a layer master nor an overall master.

When it is determined that the server (x, y, z) is neither a layer master nor an overall master, step 930 may be performed. When it is determined that the server (x, y, z) is a layer master or an overall master, step 940 may be performed.

When it is determined that the server (x, y, z) is neither a layer master nor an overall master, the server (x, y, z) may send status information thereabout to the layer master of the layer that includes the server (x, y, z), at step 930. The layer master may be the server (1, 1, z).

If step 940 is performed, both the X-coordinate and the Y-coordinate of the server (x, y, z), which is the layer master, may be 1. That is, the server (x, y, z) may be the server (1, 1, z).

At step 940, the server (1, 1, z) may check whether the server (1, 1, z) itself is an overall master.

For example, the server (1, 1, z) may determine that the server (1, 1, z) itself is an overall master if z is MIN(Z). In this case, if z is not MIN(Z), the server (1, 1, z) may determine that it is not the overall master but is a layer master. Here, MIN(Z) may be the minimum value of coordinates on the Z-axis. Alternatively, MIN(Z) may be the minimum value of the Z-coordinates of the multiple servers in the distributed file system 200.

When it is determined that the server (1, 1, z) is not the overall master, step 950 may be performed. Conversely, when it is determined that the server (1, 1, z) is the overall master, step 960 may be performed.

At step 950, the server (1, 1, z) may update status information about the z-th layer, which is managed by the server (1, 1, z) itself, using its own status information.

At step 951, the server (1, 1, z) may update the z-th layer head in the status information about the z-th layer.

At step 952, the server (1, 1, z) may send the status information about the z-th layer to the server (1, 1, MIN(Z)), which is the overall master.

If step 960 is performed, the Z-coordinate of the server (1, 1, z), which is the overall master, may be MIN(Z). That is, the server (1, 1, z) may be the server (1, 1, MIN(Z)).

At step 960, the server (1, 1, MIN(Z)) may update the status information about the MIN(Z)-th layer, which is managed by the server (1, 1, MIN(Z)) itself, using its own status information.

At step 961, the server (1, 1, MIN(Z)) may update the MIN(Z)-th layer head in the status information about the MIN(Z)-th layer.

At step 962, the server (1, 1, MIN(Z)) may update the master head 710.

After performing step 930, step 952, or step 962, step 970 may be performed.

At step 970, the server (x, y, z) may sleep for a preset time.

After step 970 is performed, step 910 may be performed again.

In a torus network, there may be different network paths depending on the dimension in which servers are connected to each other. In other words, in a 3-dimensional torus network, there may be network paths in three directions. Accordingly, in order to effectively use a torus network, the loads must be appropriately distributed among the network paths. Although there are network paths in three directions, if loads are concentrated on some network paths or on network paths in only one direction, the network bandwidth of only a single path may be used.

In order to solve the above-mentioned problem, an embodiment may separately arrange the different loads of the distributed file system 200 to each of the axes of the torus network. The different loads of the distributed file system 200 may be distributed based on the axes of the torus network.

The different loads may include an input/output load, a data replication load, and a striping load. The different loads of the distributed file system 200 are separately distributed to each of the axes of the torus network, whereby all of the bandwidth of the torus network may be used.

Figure 10:
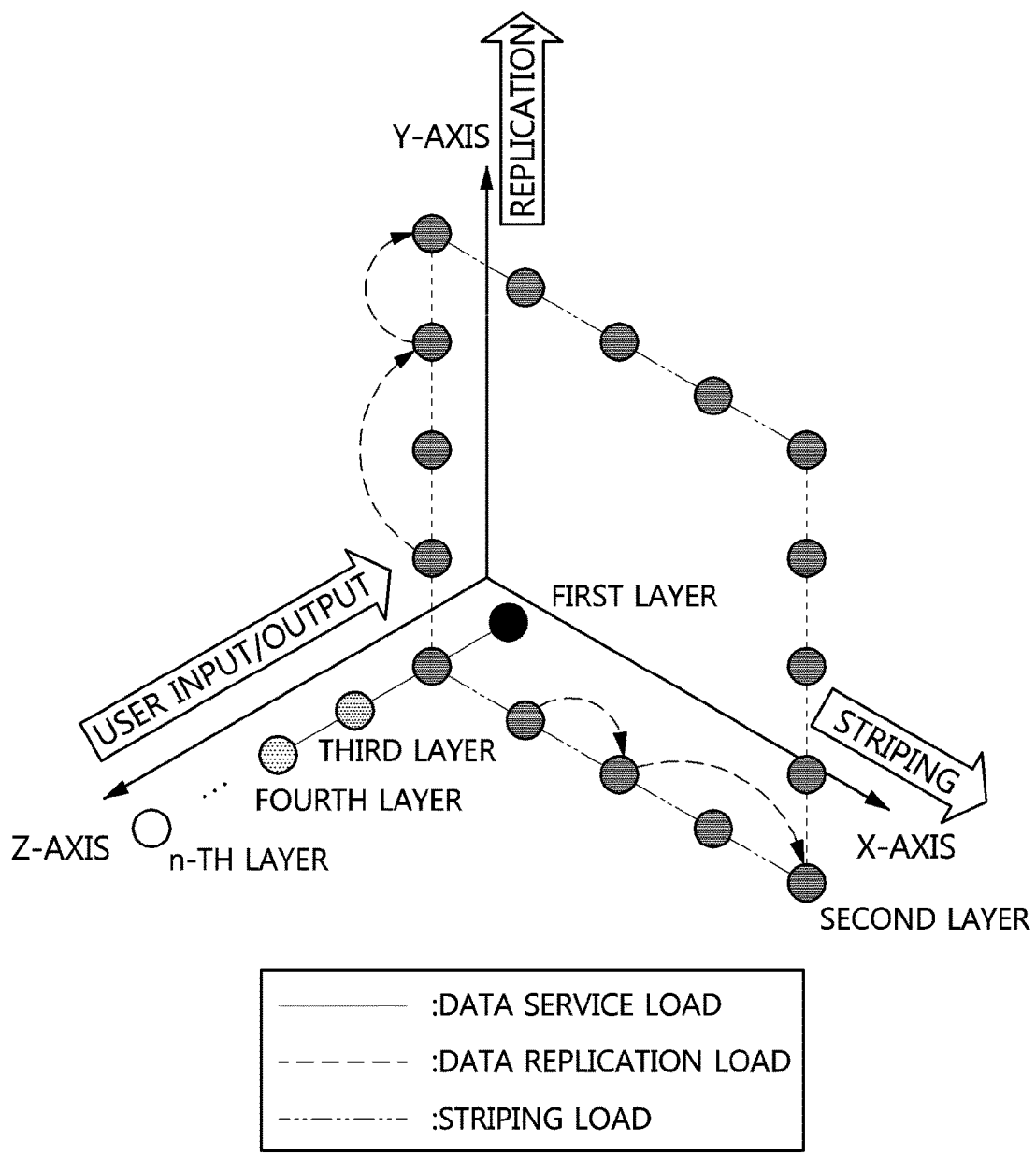
FIG. 10 illustrates a method for distributing respective loads of a distributed file system to the axes of a torus network.

FIG. 10 illustrates a method for distributing the different loads of the distributed file system to each of the axes of a torus network.

In order to distribute the different loads of the distributed file system to each of the axes of a torus network, it is necessary to consider the characteristics of the loads on the distributed file system. The characteristics of the loads on the distributed file system may be as follows:

1) Data service loads may be sent through the connection between the distributed file system 200 and the public network 299. Data service loads may be loads related to user input/output.

2) Data replication loads may be sent between the servers of the distributed file system 200 rather than along the data service path.

3) Servers connected in a chain are capable of reading striped data and writing data to be striped. Also, only the first server containing the striped data may send the data using the connection to the public network 299.

In consideration of the above-mentioned characteristics, the data service loads may be arranged in the direction of connection to the public network 299, that is, along the Z-axis. Also, the internal loads of the distributed file system 200 may be distributed among the remaining axes of the torus network, other than the first axis. The first axis may be the Z-axis. The internal loads of the distributed file system 200 may be arranged along the axes separated from the public network 299, that is, the X-axis and Y-axis. The internal loads may include data replication loads and striping loads.

According to the arrangement of loads based on the axes of the torus network, the data service loads may be assigned to paths of the public network 299, and other loads may be assigned to paths inside the torus network. Therefore, this arrangement may use all of the bandwidth of the public network 299 for data service within the scale of the given public network 299.

In a 3-dimensional torus network, allocating a data space for data service, allocating a data space for data replication, and allocating a data spaces for striping are respectively required in order to distribute data service loads, data replication loads, and striping loads into network paths that are separate from each other.

Figure 11:
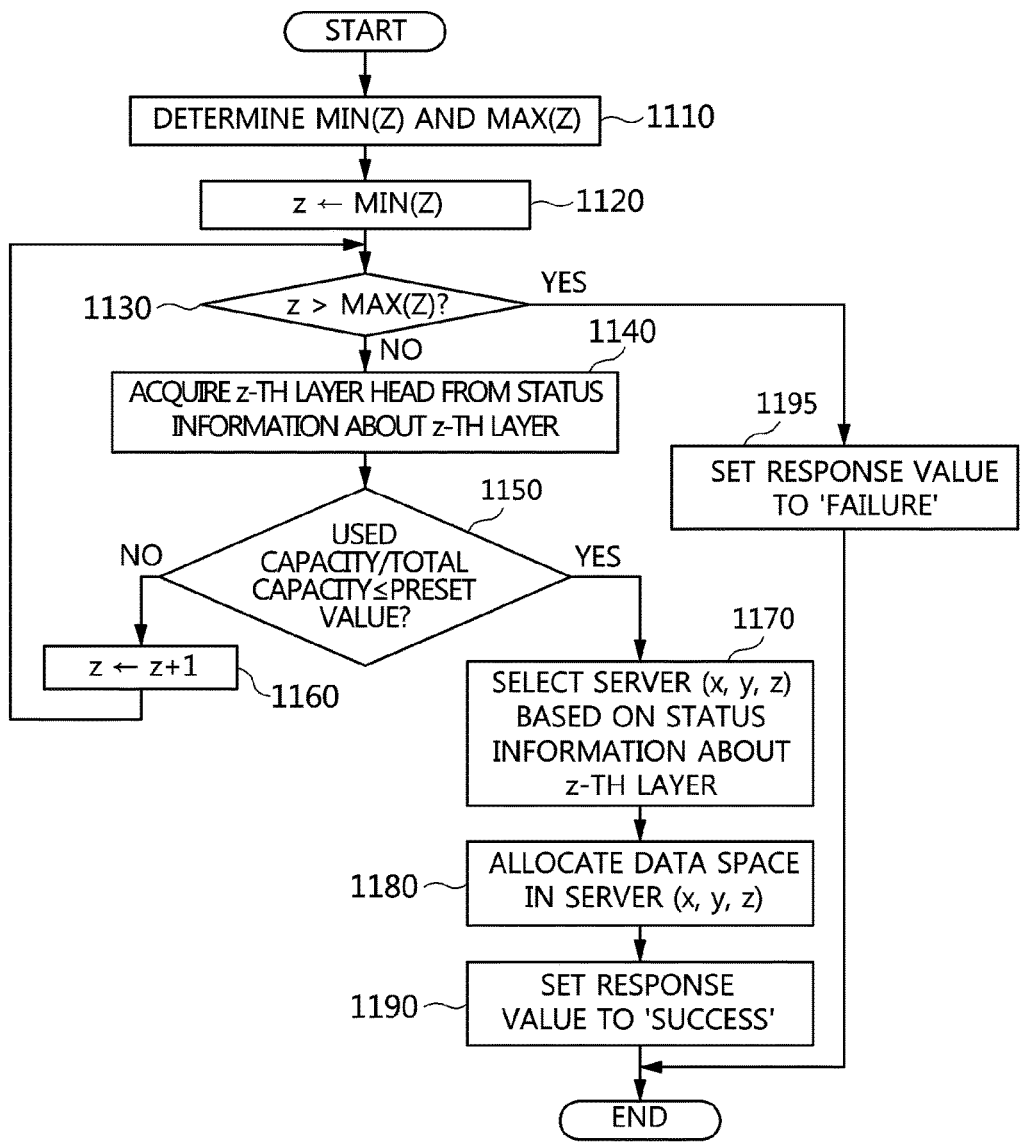
FIG. 11 is a flowchart of a method for allocating a data space for data service according to an example.

FIG. 11 is a flowchart of a method for allocating a data space for data service according to an example.

FIG. 11 describes a method for allocating a data space in order to process a request to allocate a adata space for data service.

At step 1110, the distributed file system 200 may acquire MIN(Z) and MAX(Z).

MIN(Z) may be the minimum value of the Z-coordinates of the multiple servers in the distributed file system 200 or the minimum value of the coordinates of the servers on the Z-axis. Alternatively, MIN(Z) may be the Z-coordinate of the server that is closest to the public network 299, among the multiple servers in the distributed file system 200.

MAX(Z) may be the maximum value of the Z-coordinates of the multiple servers of the distributed file system 200, or the maximum value of the coordinates of the servers on the Z-axis. Alternatively, MAX(Z) may be the Z-coordinate of the server that is farthest from the public network 299, among the multiple servers in the distributed file system 200.

At step 1120, the distributed file system 200 may assign MIN(Z) as the value of the variable z.

The variable z may represent a layer in which whether a data space can be allocated is currently being checked. The distributed file system 200 may set the MIN(Z)-th layer as the layer in which whether a data space can be allocated is currently being checked.

Whether a data space can be allocated may be checked for each layer. In other words, the distributed file system 200 may check whether a data space can be allocated in the servers in 2-dimensions.

At step 1130, the distributed file system 200 may check whether z is greater than MAX(Z).

If z is greater than MAX(Z), it may mean that a data space cannot be allocated in any layer.

If z is not greater than MAX(Z), step 1140 may be performed. If z is greater than MAX(Z), step 1195 may be performed.

At step 1140, the distributed file system 200 or the layer master of the z-th layer may acquire the z-th layer head from the status information about the z-th layer. The distributed file system 200 may acquire the used capacity of the layer and the total capacity of the layer from the z-th layer head.

At step 1150, the distributed file system 200 may check whether the percentage of the used capacity of the layer is equal to or less than a preset value. The percentage of the used capacity may be a value acquired by dividing the total capacity of the layer by the used capacity of the layer.

That the percentage of the used capacity of the layer is equal to or less than the preset value may mean that the ratio of the used capacity of the layer to the total capacity of the layer is equal to or less than the preset value. Also, that the percentage of the used capacity of the layer is equal to or less than the preset value may mean that the z-th layer has available capacity for data space allocation.

If the percentage of the used capacity of the layer is greater than the preset value, step 1160 may be performed.

If the percentage of the used capacity of the layer is equal to or less than the preset value, step 1170 may be performed.

At step 1160, the distributed file system 200 may increase the value of z by 1.

The distributed file system 200 increases the value of z by 1, whereby whether the data space can be allocated is being checked in the layer subsequent to the current layer. For example, the 2-dimensional server group that will be the target of checking may be acquired by moving one position along the Z-axis.

After step 1160 is performed, step 1130 may be performed again in order to check whether a data space can be allocated in the next layer.

Through steps 1120, 1130, and 1160, the distributed file system 200 may sequentially check from the layer that is closest to the public network 299 to the layer that is farthest from the public network 299 in order to check whether a data space can be allocated in the corresponding layer, in response to the request to allocate a data space for data service.

When a data space is allocated in the current z-th layer, step 1170 may be performed. In other words, when the layer in which a data space is to be allocated is selected, step 1170 may be performed.

At step 1170, based on the status information about the z-th layer, the distributed file system 200 or the layer master of the z-th layer may select the server (x, y, z) in which a data space is to be allocated from among the servers in the z-th layer.

At step 1180, the distributed file system 200, the layer master of the z-th layer, or the server (x, y, z) may allocate a data space for data service in the server (x, y, z).

At step 1190, the distributed file system 200, the layer master of the z-th layer, or the server (x, y, z) may set the response value for the data space allocation for data service to 'success'.

When a data space cannot be allocated in any of the layers of the distributed file system 200, step 1195 may be performed.

At step 1195, the distributed file system 200 may set the response value for the data space allocation for data service to 'failure'.

As described above with reference to the embodiment, the data service loads on the distributed file system 200 may be distributed along the first axis, among the n-dimensional axes of the torus network. Here, the first axis may be the Z-axis. The first axis may be the axis corresponding to the distance from the public network 299.

In response to the request to allocate a data space for data service, the distributed file system 200 may preferentially allocate a data space from the server that is close to the public network 299, among the servers in the distributed file system 200 or data space in the layer that is close to the public network 299.

The above-mentioned method for allocating a data space for data service enables newly created data to be located close to the public network 299. The newly created data are expected to be frequently accessed. Therefore, the above-mentioned method for allocating a data space may improve the input/output performance of the frequently accessed data.

Figure 12:
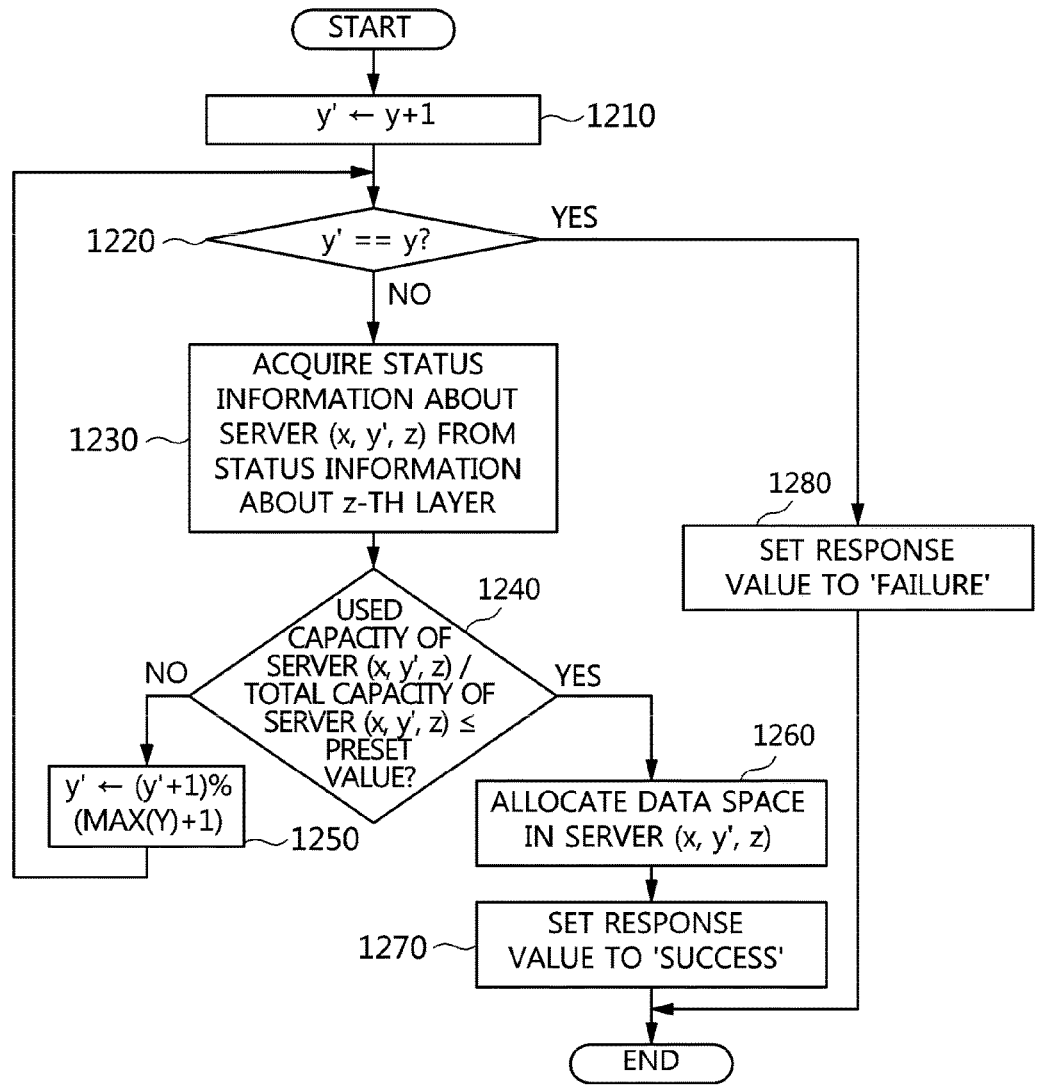
FIG. 12 is a flowchart of a method for allocating a data space for data replication according to an example.

FIG. 12 is a flowchart of a method for allocating a data space for data replication according to an example.

FIG. 12 describes a method for allocating a data space in order to process a request to allocate a data space for data replication.

An embodiment describes that data replication loads are arranged along the Y-axis. That is, a distributed file system 200 may arrange loads for data replication or networks for data replication on the Y-axis.

A server (x, y, z) may store original data. The distributed file system 200 may allocate a data space for replicating the original data. Allocating a data space for data replication may be similar to allocating a data space for data service, which was described above with reference to FIG. 11. However, allocating a data space for data replication may differ from allocating a data space for data service in the following aspects.

1) Allocating a data space for data replication may progress from the location (x, y+1, z) along the Y-axis. Whether a data space can be allocated may be checked for the servers on the Y-axis, on which the server (x, y, z) that stores the original data is located.

2) In order to determine the next Y-coordinate, a turnaround method may be used. That is, a circular torus network may be considered.

At step 1210, the distributed file system 200 may assign y+1 as the value of the variable y'.

As described above, the server (x, y, z) may store original data. The server (x, y', z) may represent the server in which whether a data space can be allocated for data replication is currently being checked. Here, y' may be the Y-coordinate of the server (x, y', z).

The distributed file system 200 may select the server (x, y', z), in which whether a data space can be allocated for data replication is to be checked, along the Y-axis. The server (x, y', z), in which whether a data space can be allocated for data replication is to be checked, may be a server that is close to the server (x, y, z), which stores the original data, on the Y-axis.

The server (x, y, z), which stores the original data, and the server (x, y', z), in which whether data space can be allocated for data replication is being checked, may be located on the same Y-axis.

At step 1220, the distributed file system 200 may check whether y' is the same as y.

Here, that y' is the same as y' may represent that whether a data space can be allocated for data replication is checked for all of the servers, the X-coordinate and Y-coordinate of which are identical to those of the server (x, y, z) that stores the original data, but a data space cannot be allocated in any of the servers.

If y' is not identical to y, step 1230 may be performed. If y' is identical to y, step 1280 may be performed.

At step 1230, the distributed file system 200 may acquire the status information about the server (x, y', z) from the status information about the z-th layer. The distributed file system 200 may acquire the used capacity of the server (x, y', z) and the total capacity of the server (x, y', z) from the status information about the server (x, y', z).

At step 1240, the distributed file system 200 may check whether the percentage of the used capacity of the server is equal to or less than a preset value. The percentage of the used capacity of the server may be a value acquired by dividing the total capacity of the server (x, y', z) by the used capacity of the server (x, y', z).

That the percentage of the used capacity of the server is equal to or less than the preset value may mean that the ratio of the used capacity of the server to the total capacity of the server is equal to or less than the preset value. Also, that the percentage of the used capacity of the server is equal to or less than the preset value may mean that the server (x, y', z) has available capacity for data space allocation.

If the percentage of the used capacity of the server is greater than the preset value, step 1250 may be performed. If the percentage of the used capacity of the server is equal to or less than the preset value, step 1260 may be performed.

At step 1250, the distributed file system 200 may set the value of y' to (y'+1) % (MAX(Y)+1). Here, MAX(Y) may be the maximum permissible value of y'. MAX(Y) may be the maximum value of the Y-coordinates of the multiple servers in the distributed file system 200. Alternatively, MAX(Y) may be the maximum value of the coordinates of the servers on the Y-axis.

The distributed file system 200 may increase the value of y' by 1 using a turnaround method.

The distributed file system 200 increases the value of y' by 1 using the turnaround method, whereby a server subsequent to the current server may be checked for whether a data space can be allocated therein. For example, the server that will be the target of checking the data space allocation may be acquired by moving by one position along the Y-axis. If the Y-coordinate of the server (x, y', z), which was the target of checking for data space allocation, is the maximum value, the distributed file system 200 may check the next server (x, 1, z) for data space allocation.

After step 1250 is performed, step 1220 may be performed again in order to check whether a data space can be allocated in the next server.

Through steps 1210, 1220, and 1250, the distributed file system 200 may check servers along the Y-axis from the server (x, y+1, z) by using a turnaround method in order to check whether a data space can be allocated in the corresponding server, in response to the request to allocate a data space for data replication. The server (x, y+1, z) may be a server that is one position away from the server (x, y, z) on the Y-axis.

When a data space is allocated in the current server (x, y', z), step 1260 may be performed. In other words, when the server in which a data space is to be allocated is selected, step 1260 may be performed.

At step 1260, the distributed file system 200 or the server (x, y', z) may allocate data space for data replication in the server (x, y', z).

At step 1270, the distributed file system 200 or the server (x, y', z) may set the response value for the data space allocation for data replication to 'success'.

When a data space cannot be allocated in any of the servers on the Y-axis on which the server (x, y, z) is located, step 1280 may be performed.

At step 1280, the distributed file system 200 may set the response value for the data space allocation for data replication to 'failure'.

As described above with reference to the embodiment, the data replication loads of the distributed file system 200 may be distributed along the second axis, among the n-dimensional axes of the torus network. Here, the second axis may be one of the remaining axes, excluding the first axis, from the n-dimensional axes of the torus network. The second axis may be the Y-axis. The first axis may be the Z-axis.

In response to a request to allocate a data space for data replication, the distributed file system 200 checks servers along the second axis from the server that is closest to the server storing the original data to the server that is farthest from the server storing the original data using a turnaround method, whereby the distributed file system 200 may select the server in which a data space is to be allocated for replicating the original data.

The above-mentioned method for allocating a data space for data replication may assign the data replication loads to the Y-axis.

Figure 13:
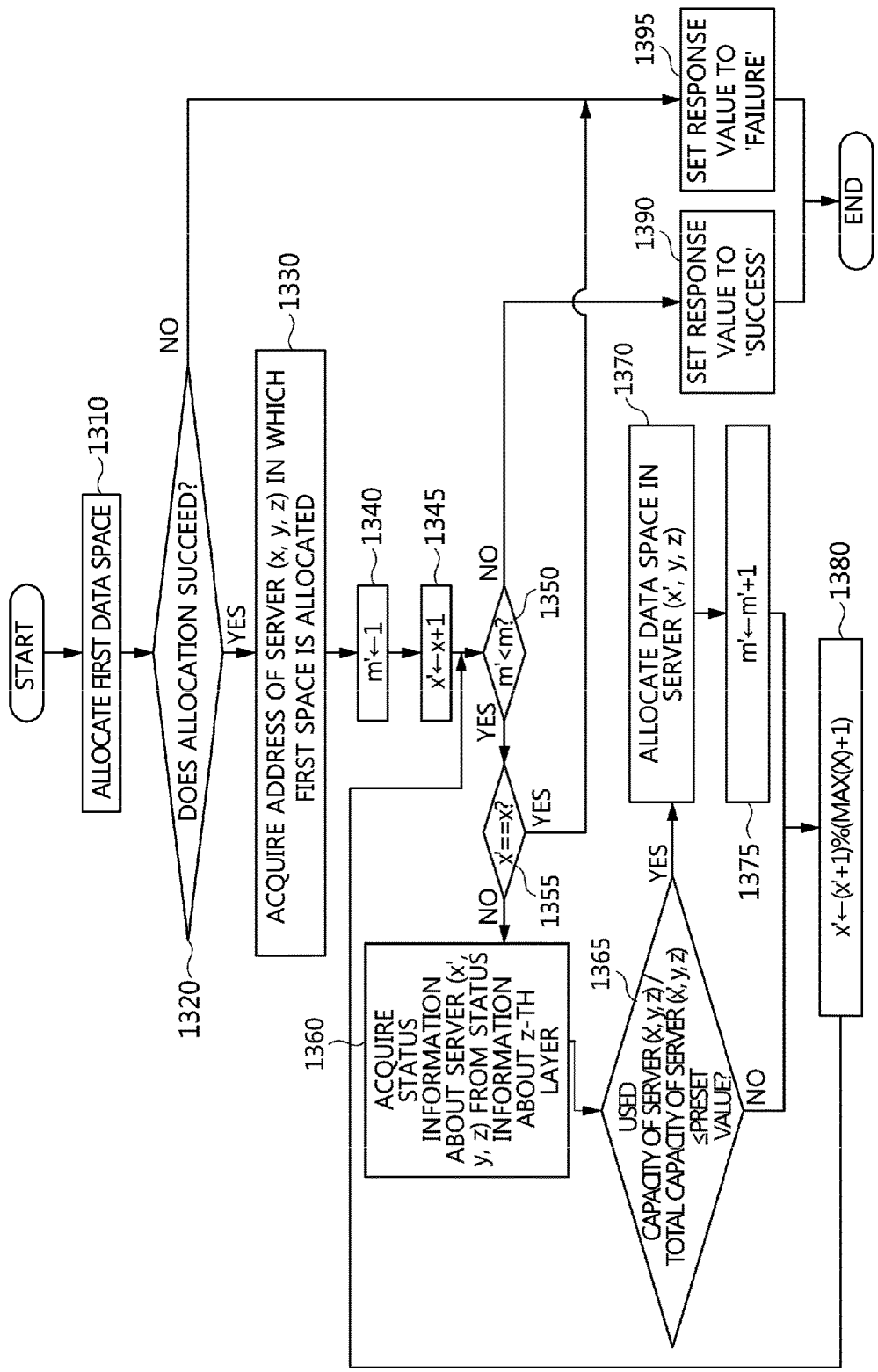
FIG. 13 is a flowchart of a method for allocating a data space for striping according to an example.

FIG. 13 is a flowchart of a method for allocating a data space for striping according to an embodiment.

Striping may mean distributing data processing among m servers. For example, striping may include a networked Redundant Array of Independent Disks (RAID) and an N+M format. Data processing may include reading data and writing data.

For striping, it is necessary to select m servers for storing data and to allocate a data space in each of m servers. The data space for striping may include the first data space to the m-th data space. The first data space to the m-th data space may be respectively included in the first server to the m-th server.

Hereinafter, the method for allocating a data space in response to a request to allocate a data space for striping is described.

An embodiment describes that striping loads are arranged on the X-axis. In other words, the distributed file system 200 may arrange the loads for striping or networks for striping on the X-axis.

At step 1310, the distributed file system 200 may allocate the first data space for striping. A data space may be allocated in response to a request to allocate a data space for data service. The request to allocate a data space may be made by the embodiment described above with reference to FIG. 11. For example, step 1310 may include at least some of steps 1110, 1120, 1130, 1140, 1150, 1160, 1170, 1180, 1190, and 1195.

A first server (x, y, z), in which a data space is to be allocated for striping, may be selected by step 1310.

At step 1320, the distributed file system 200 may check whether the first data space allocation for striping succeeded. Alternatively, the distributed file system 200 may check whether processing of the request for the first data space allocation for striping succeeded.

When the data space allocation or processing of the request for data space allocation succeeds, step 1330 may be performed. When the data space allocation or processing of the request for the data space allocation does not succeed, step 1395 may be performed.

When the first server (x, y, z), in which a data space for striping is to be allocated is selected, the remaining (m−1) servers, in which data spaces for striping are to be allocated, may be selected through the following steps 1330, 1340, 1345, 1350, 1360, 1370, 1380, 1390, and 1395. When the first server (x, y, z) is selected, the distributed file system 200 may select the remaining (m−1) servers, in which data spaces are to be allocated, by checking servers from the location (x+1, y, z) along the X-axis. While checking the servers along the X-axis, when the last server has been checked, the server in the location (1, y, z) may be checked again according to a turnaround method.

At step 1330, the distributed file system 200 may acquire the location (x, y, z) of the server in which the first data space was allocated. The distributed file system 200 may set the values of the variable x, variable y, and variable z.

At step 1340, the distributed file system 200 may set the value of the variable m' to 1.

The value of m' may denote the number of servers in which a data space has been allocated for striping. The distributed file system 200 may represent that the data space for striping has been allocated in one server by setting the value of m' to 1.

At step 1345, the distributed file system 200 may set the value of x' to x+1.

As described above, the server (x, y, z) may be the first server in which a data space has been allocated for striping. The server (x', y, z) may represent the server in which whether a data space can be allocated for striping is currently being checked. Here, x' may be the X-coordinate of the server (x', y, z).

The distributed file system 200 may select the server (x', y, z), in which whether a data space can be allocated for striping is checked, along the X-axis. The server (x', y, z) in which whether a data space can be allocated for striping is checked may be a server that is close to the first server (x, y, z), in which a data space has been allocated for striping, on the X-axis.

The server (x, y, z), in which a data space has been allocated for striping, and the server (x', y, z), in which whether a data space can be allocated for striping is being checked, may be located on the same X-axis.

At step 1350, the distributed file system 200 may check whether the value of m' is less than m.

That the value of m' is less than m may mean that the number of servers in which a data space has been allocated for striping is less than the number of servers necessary for data space allocation for striping.

Conversely, that the value of m' is not less than m may mean that the data space for striping has been allocated in the required number of servers.

When the value of m' is less than m, step 1355 may be performed in order to allocate an additional data space. When the value of m' is not less than m, step 1390 may be performed.

At step 1355, the distributed file system 200 may check whether x' is identical to x.

That x' is identical to x may mean that whether a data space can be allocated for striping has been checked for all of the servers, the X-coordinate and Y-coordinate of which are identical to those of the first server (x, y, z) in which a data space has been allocated for striping, but a data space cannot be allocated in m servers.

If x' is identical to x, step 1395 may be performed. If x' is not identical to x, step 1360 may be performed.

At step 1360, the distributed file system 200 may acquire the status information about the server (x', y, z) from the status information about the z-th layer. The distributed file system 200 may acquire the used capacity of the server (x' y, z) and the total capacity of the server (x' y, z) from the status information about the server (x' y, z).

At step 1365, the distributed file system 200 may check whether the percentage of the used capacity of the server is equal to or less than a preset value. The percentage of the used capacity of the server may be a value acquired by dividing the total capacity of the server (x', y, z) by the used capacity of the server (x', y, z).

That the percentage of the used capacity of the server is equal to or less than the preset value may mean that the ratio of the used capacity of the server to the total capacity of the server is equal to or less than the preset value. Also, that the percentage of the used capacity of the server is equal to or less than the preset value may mean that the server (x', y, z) has available capacity for data space allocation.

If the percentage of the used capacity of the server is greater than the preset value, step 1380 may be performed. If the percentage of the used capacity of the server is equal to or less than the preset value, step 1370 may be performed.

At step 1370, the distributed file system 200 or the server (x', y, z) may allocate a data space for striping in the server (x', y, z).

Through step 1370, an additional server in which a data space is to be allocated for striping may be selected.

At step 1375, the distributed file system 200 may increase the value of m' by 1.

By increasing the value of m' by 1, the distributed file system 200 may represent that the number of servers in which a data space has been allocated for striping has increased by 1.

At step 1380, the distributed file system 200 may set the value of x' to (x'+1) % (MAX(X)+1). Here, MAX(X) may be the maximum permissible value of x'. MAX(X) may be the maximum value of the X-coordinates of the multiple servers in the distributed file system 200. Alternatively, MAX(X) may be the maximum value of the coordinates of the servers on the X-axis.

The distributed file system 200 may increase the value of x' by 1 using a turnaround method.

The distributed file system 200 increases the value of x' by 1 using a turnaround method, whereby the server subsequent to the current server may be checked for whether a data space can be allocated therein. For example, the server that will be the target of checking the data space allocation may be acquired by moving one position along the X-axis. If the X-coordinate of the server (x', y, z), which was the target of checking the data space allocation, is the maximum value, the distributed file system 200 may check the next server (1, y, z) for data space allocation.

After step 1380 is performed, step 1350 may be performed again in order to check whether a data space can be allocated in the next server.

Through steps 1345, 1355, and 1380, the distributed file system 200 may check the servers on the X-axis, starting with the first server (x, y, z), in which a data space has been allocated for striping, by using a turnaround method in order to check whether a data space can be allocated in the corresponding server, in response to a request to allocate a data space for striping. The server (x+1, y, z) may be a server that is one position away from the server (x, y, z) on the X-axis.

When a data space has been allocated for striping in m servers, step 1390 may be performed.

At step 1390, the distributed file system 200 or the server (x', y, z) may set the response value for the data space allocation for striping to 'success'.

When a data space cannot be allocated in m servers, step 1395 may be performed.

At step 1395, the distributed file system 200 may set the response value for the data space allocation for striping to 'failure'.

As described with reference to the embodiment, the striping loads of the distributed file system 200 may be distributed along the third axis among the n-dimensional axes of the torus network. Here, the third axis may be one of the remaining axes, excluding the first and second axes, from the n-dimensional axes of the torus network. The third axis may be the X-axis. The first axis may be the Z-axis. The second axis may be the Y-axis.

The distributed file system 200 may allocate a data space in the multiple servers for striping. Also, the distributed file system 200 may select the first server, in which the first data space is to be allocated, from among the multiple servers in the distributed file system 200. The distributed file system 200 may select servers, in which the remaining data space is to be allocated, by checking the servers along the third axis, from the server that is closest to the first server to the server that is farthest from the first server.

Figure 14:
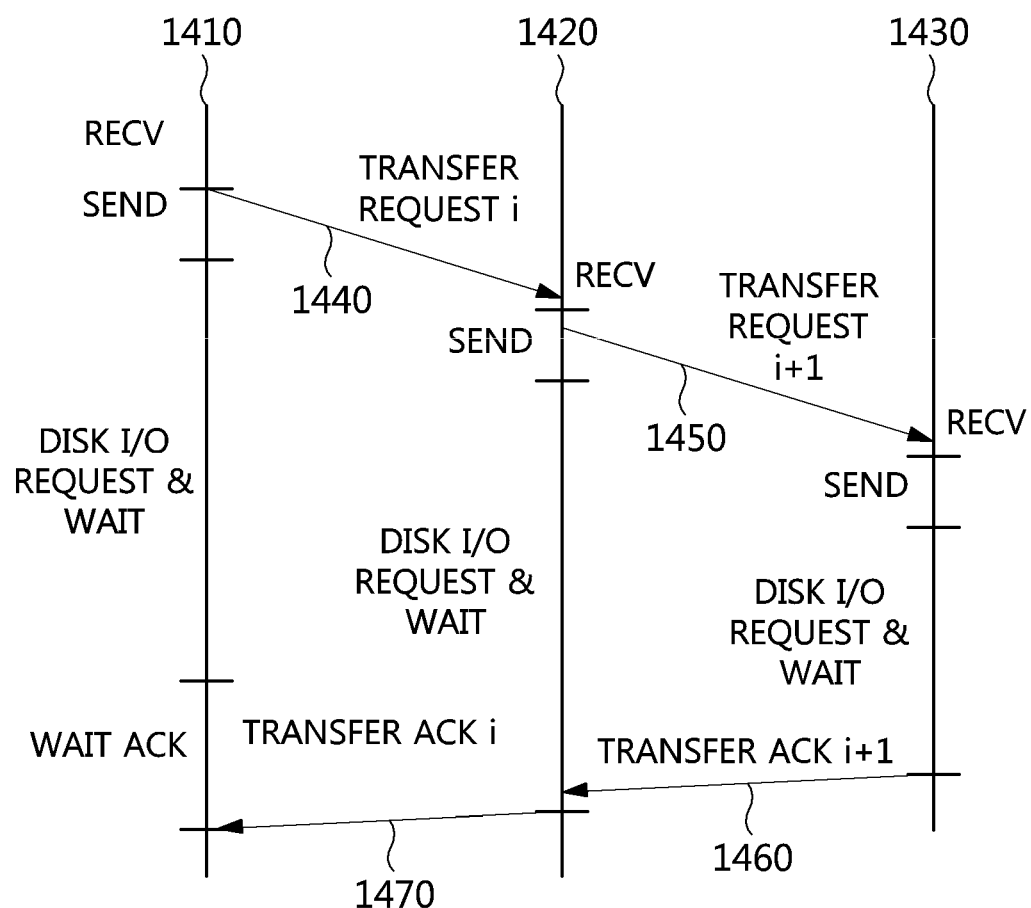
FIG. 14 describes an input/output protocol for striping or data replication according to an example.

FIG. 14 describes an input/output protocol for striping or data replication according to an embodiment.

As described above, the network loads of the distributed file system 200 may be distributed into the axes of the torus network in which the multiple servers are connected to each other. In the distributed file system 200, an input/output protocol for processing striping and data replication at the lowest cost may be used.

A request for striping and a request for data replication may be processed by being transferred from a starting server to a terminal server. When a server that has received a request processes the request and then transfers the request to the next server, the time for processing the request may be the total of the processing times of all of the servers. In other words, the time for processing the request may increase with the number of servers that process the request.

FIG. 14 illustrates the operations of the first server 1410, the second server 1420, and the third server 1430, which are servers for processing a request. In FIG. 14, the vertical lines may represent the operations performed by the first server 1410, the second server 1420, and the third server 1430.

For the first server 1410, the section, in which operations such as receiving (recv), sending (send), requesting and waiting for disk input/output (disk I/O request & wait), and waiting for an acknowledgement (wait ack) are performed, is illustrated. For the second server 1420, the section in which operations such as receiving, sending, requesting and waiting for disk input/output, and waiting for an acknowledgement are performed is illustrated. For the third server 1430, the section in which operations such as receiving, sending, requesting and waiting for disk input/output, and waiting for an acknowledgement are performed is illustrated.

The first server 1410, the second server 1420, and the third server 1430 may represent at least some of the multiple servers that process striping or data replication.

As illustrated in FIG. 14, a server that has received a request for striping or a request for data replication does not wait until the completion of processing the request but immediately transfers the request to the next server. As an example of this, the transfer 1440 of the transfer request i and the transfer 1450 of the transfer request i+1 are illustrated. Here, i may be a number that denotes the sequential position of the transfer request.

This transfer may continue to the last server. When the last server, having received the request, finishes processing the request, the last server may transfer a completion message to the previous server, which transferred the request to the last server. If the server, which received the completion message, has not completed processing the request, the server may wait for the completion of processing of the request. When the server, which received the completion message, completes processing the request, the server may transfer the completion message to the previous server.

The completion message may be a transfer acknowledgement. As an example of the completion message, the transfer acknowledgement i+1 1460 and the transfer acknowledgement i 1470 are illustrated. Here, i may be a number that denotes transfer acknowledgement in reverse order.

The protocol of the embodiment may enable the torus network, in which data must pass through intermediate servers in order to be transferred, to transfer data along a shorter path than the fat-tree network. In a fat-tree network, data transferred through a network are required to pass through a switch.

Based on the input/output protocol of the embodiment, a method for writing data to be striped and a method for reading striped data are described below.

Figure 15A:
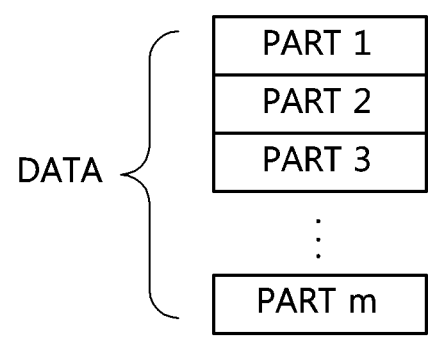
FIGS. 15A, 15B, and 15C describe a method for writing data to be striped according to an example.
Figure 15B:
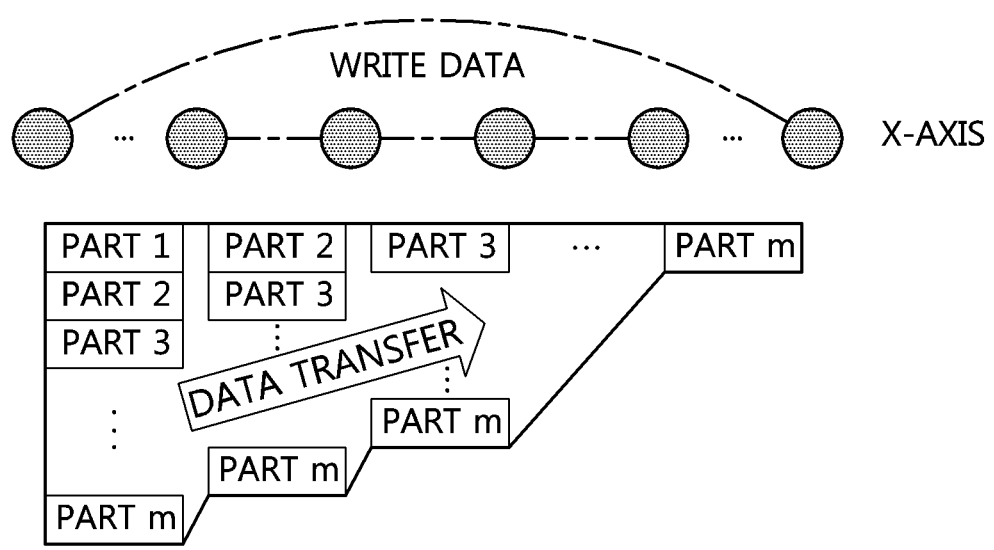
Figure 15C:
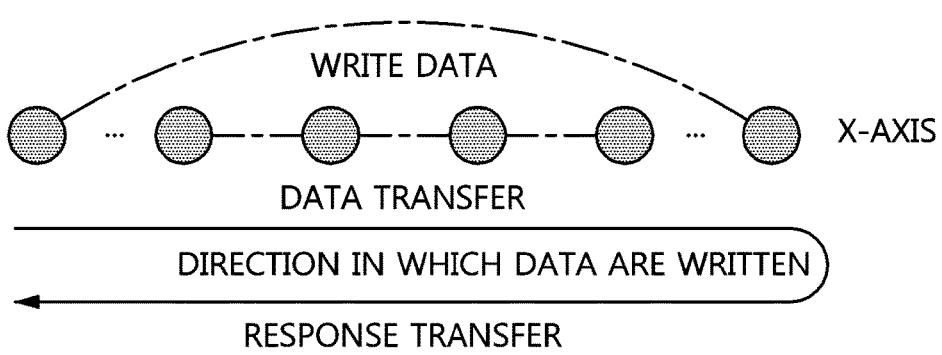

FIG. 15A, FIG. 15B, and FIG. 15C describe a method for writing data to be striped according to an example.

FIG. 15A describes data requested to be written according to an example.

Data to be striped 1500 may be divided into m parts. The m parts may be respectively processed by m servers through striping.

FIG. 15B describes a process in which servers write data to be striped according to an embodiment.

The circles on the upper side may represent servers on the X-axis.

When a user requests writing of the data to be striped 1500, all of the data, having m parts, may be transferred to the first server. The first server may receive the m parts of data. In this case, the first server may transfer the remaining data, excluding the data to be processed by itself from the m parts of data, to the next, i.e. second, server. This process, that is, removal and transfer, may continue until the part m is transferred to the m-th server.

In the distributed file system 200, when the multiple servers for storing striped data process a request to write data to be striped, each of the multiple servers may transfer the remaining data, excluding data to be processed by itself, from the received data, to the next server. Also, each of the multiple servers may write the data that are not transferred to the next server.

FIG. 15B illustrates an example in which the first server writes the part 1. The first server to the m-th server may write part 1 to part m, respectively.

FIG. 15C describes data transfer and response transfer in response to a request to write data to be striped according to an example.

The data transfer, described above with reference to FIG. 15B, may continue until the request to write data to be striped is transferred along the X-axis to the last server. The last server, among the multiple servers for storing striped data, may generate a completion message as a response to the request to write data to be striped when it has completed processing the request to write the data.

The last server may transfer the completion message to the server that transferred the request to write data to be striped to the last server. The server, which received the completion message, may transfer again the completion message to the server that transferred the request to write data. This transfer of the completion message may continue until the completion message is transferred to the first server. In other words, the completion message may be transferred in the direction that is opposite to the direction in which the request to write data to be striped was transferred.

For example, data may be transferred in the direction that is the same as the direction in which the data are written, and a response may be transferred in the direction that is opposite to the direction in which the data are written.

Finally, when the first server receives the completion message, the first server may transfer a final completion message to a user after it completes processing the request to write data to be striped.

Figure 16A:
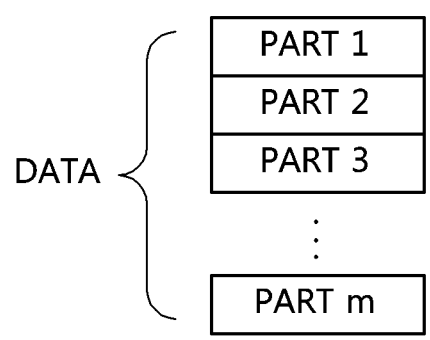
FIGS. 16A, 16B, and 16C describe a method for reading striped data according to an example.
Figure 16B:
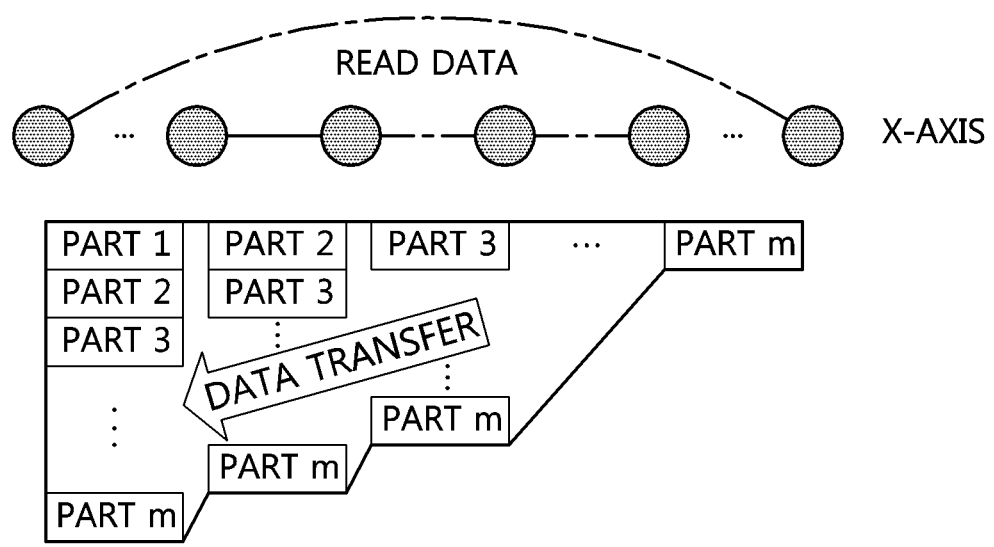
Figure 16C:
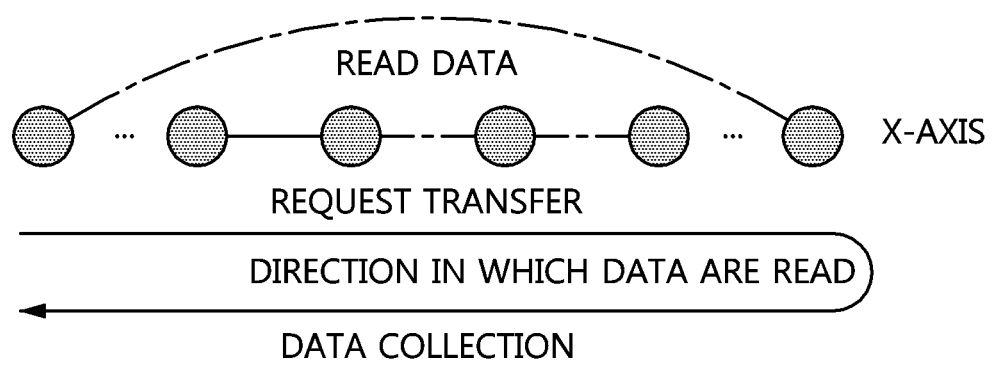

FIG. 16A, FIG. 16B, and FIG. 16C describe a method for reading striped data according to an example.

FIG. 16A describes striped data requested to be read according to an example.

The striped data 1600 may be separated into m parts. The m parts may be respectively processed by m servers through striping.

FIG. 16B describes reading striped data by servers according to an example.

The circles on the upper side may represent servers.

When a user requests reading of the striped data 1600, the request to read the striped data may be transferred to the first server. The first server may transfer the request to read the striped data to the second server. Also, after transferring the request to read the striped data, the first server may read the data that it is process. This process, that is, transfer and reading, may continue until the request to read the striped data is transferred to the m-th server.

When the multiple servers in the distributed file system 200, which store the striped data, process the request to read the striped data, each of the multiple servers may transfer the request to read the striped data to the next server. Also, after transferring the request to read the striped data to the next server, each of the multiple servers may read some of the data separated into m parts.

In response to the request to read the striped data, the data read by the multiple servers in the distributed file system 200 may be combined and transferred in the direction that is opposite to the direction in which the request to read the striped data was transferred.

FIG. 16B illustrates an example in which the first server reads the part 1. The first server to the m-th server may read the part 1 to part m, respectively.

FIG. 16C describes request transfer and data gathering in response to the request to read striped data.

The transfer of the request to read striped data, described above with reference to FIG. 16B, may continue until the request to read the striped data is transferred to the last server based on the X-axis. Among the multiple servers that store striped data, the last server may acquire data read in response to the request to read the striped data after it completes processing the request to read the striped data.

The last server may transfer the read data to the server that transferred the request to read the striped data to the last server. The server that received the read data combines the received data with the data read by itself, whereby the combined data may be generated. Then, the server may transfer again the combined data to the server that transferred the request to read the striped data thereto. This process, that is, data gathering, may continue until all the data, read by all of the multiple servers that store the striped data, are combined. Here, the process for data gathering may progress in the direction that is opposite to the direction in which the request to read the striped data was transferred.

For example, the request to read the striped data may be transferred in the direction that is the same as the direction in which the data are read, and the combined data may be transferred in the direction that is opposite to the direction in which the data are read.

Finally, when the first server receives data from the second server, the first server combines the data read by itself with the received data, whereby the combined data may be generated. Then, in response to the request to read the striped data, the first server may transfer the finally combined data to a user.

Figure 17A:
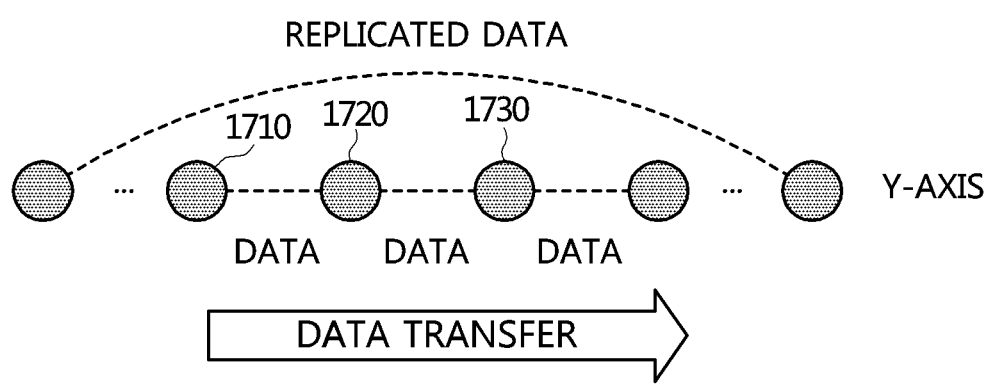
FIGS. 17A and 17B describe a method for replicating data according to an example.
Figure 17B:
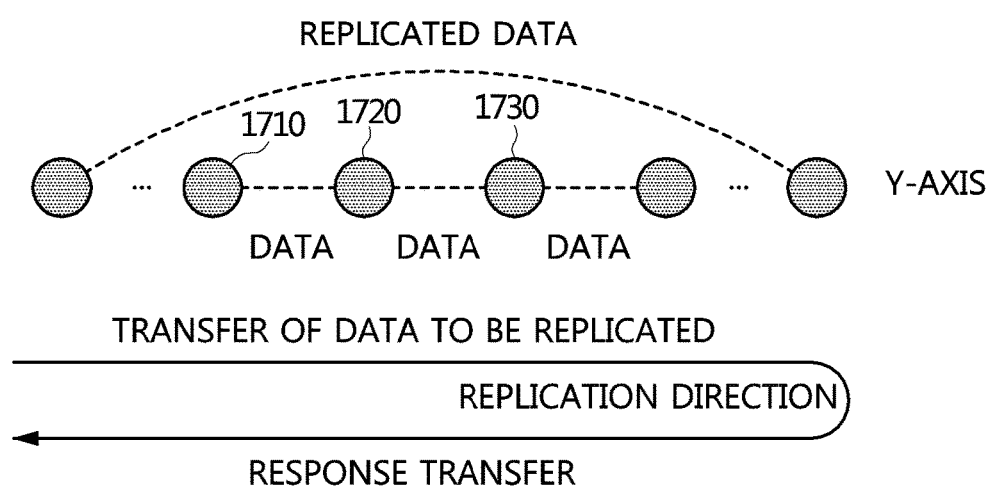

FIG. 17A and FIG. 17B describe a method for replicating data according to an example.

FIG. 17A describes data replication according to an example.

FIG. 17A depicts a method for replicating original data in the data space allocated by the embodiment described above with reference to FIG. 12.

The circles on the upper side may represent servers on the Y-axis. In FIG. 17A, servers related to data replication are illustrated.

The server 1710 that stores original data may receive a request to replicate data. When it receives the request to replicate data, the server 1710, which stores the original data, may transfer the data to be replicated and the request to replicate the data to the server 1720 at the next location based on the Y-axis.

The server 1720, which received the request to replicate the data, does not wait until the completion of replication of the data, but transfers the data to be replicated and the request to replicate the data to the next server 1730 along the Y-axis.

When the multiple servers in the distributed file system 200, which perform data replication, process the request to replicate data, each of the multiple servers may transfer the request to replicate the data and the received data for replication to the next server, rather than waiting for the completion of replication of the data in response to the request to replicate the data. Also, each of the multiple servers may replicate the received data.

FIG. 17B describes the transfer of data to be replicated and the transfer of the response to the request to replicate data according to an example.

Transferring data to be replicated and a request to replicate the data, described above with reference to FIG. 17A, may continue until the data to be replicated and the request to replicate the data are transferred to the last server based on the Y-axis. Among the multiple servers that perform data replication, the last server may generate a completion message in response to the request to replicate data when it completes processing the request to replicate the data.

The last server may transfer the completion message to the server that transferred the request to replicate data to the last server. The server that received the completion message may again transfer the completion message to the server that transferred the request to replicate data thereto. The transfer of the completion message may continue until the completion message is transferred to the first server 1710. In other words, the completion message may be transferred in the direction that is opposite to the direction in which the request to replicate data was transferred.

For example, the data to be replicated may be transferred in the direction that is the same as the replication direction in which the data replication progresses, and a response may be transferred in the direction that is opposite to the replication direction.

Finally, when the first server 1710 receives the completion message, the first server may transfer a final completion message to a user in response to the request to replicate data after it completes processing the request to replicate the data.

Figure 18:
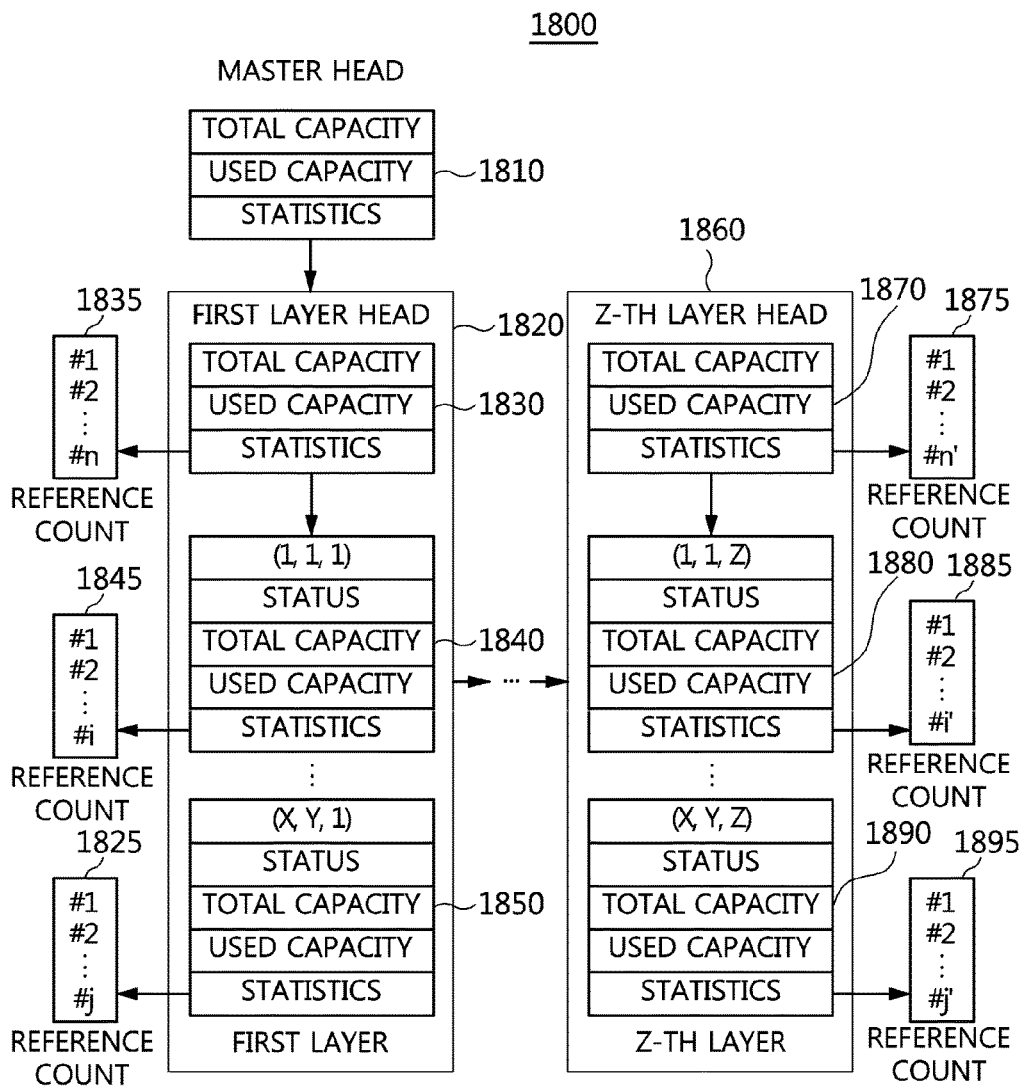
FIG. 18 shows information about accessing predetermined data in a distributed file system according to an example.

FIG. 18 illustrates information about access to predetermined data in a distributed file system according to an embodiment.

In FIG. 18, the status information 1800 may correspond to the status information 700 described above with reference to FIG. 7. The master head 1810 may correspond to the master head 710. The status information 1820 about the first layer and the status information 1860 about the Z-th layer may correspond to the status information 720 about the first layer and the status information 760 about the Z-th layer, respectively. The first layer head 1830 and the Z-th layer head 1870 may correspond to the first layer head 730 and the Z-th layer head 770, respectively. The status information 1840 about the server (1, 1, 1) and the status information 1850 about the server (X, Y, 1) may correspond to the status information 740 about the server (1, 1, 1) and the status information 750 about the server (X, Y, 1), respectively. The status information 1880 about the server (1, 1, Z) and the status information 1890 about the server (X, Y, Z) may correspond to the status information 780 about the server (1, 1, Z) and the status information 790 about the server (X, Y, Z), respectively. Repeated descriptions will be omitted.

Pieces of status information may include pieces of statistical information. The statistics 1830 of the first layer head may include the statistical information 1835 about the first layer head. The statistics 1870 of the Z-th layer head may include the statistical information 1875 about the Z-th layer head. The statistics of the status information 1840 about the server (1, 1, 1) may include the statistical information 1845 about the server (1, 1, 1). The statistics of the status information 1850 about the server (X, Y, 1) may include the statistical information 1855 about the server (X, Y, 1). The statistics of the status information 1880 about the server (1, 1, Z) may include the statistical information 1885 about the server (1, 1, Z). The statistics of the status information 1890 about the server (X, Y, Z) may include the statistical information 1895 about the server (X, Y, Z).

The status information 1800 may be a data structure for collecting information about access to the data in the distributed file system 200 and for tracing and managing the frequency with which the data are accessed. The status information 1800 may have a format in which data, related to data access, are added to the reference information 700, which was described with reference to FIG. 7.

The distributed file system 200 may collect information about access to the data therein using the status information 1800. Also, the distributed file system 200 may trace and manage the frequency with which the data therein are accessed using the status information 1800.

The servers of the distributed file system 200 may collect information about access to the data therein. The servers may transfer the collected information about the access to the layer master of the layer in which the servers are included.

The layer master may collect information about access to the data therein. The layer master may store the collected information about the access as the statistical information about the layer master.

The statistical information in the layer head may include a preset number of reference counts. The reference counts may represent the number of references to data in the layer master. In other words, based on the information about the access to the data in the layer, the layer master may determine the preset number of pieces of data that are frequently accessed, among the data in the layer. The layer master may distinguish the preset number of frequently accessed data from the data therein using the reference counts.

The statistical information in the server head may include a preset number of reference counts. The reference counts may represent the number of references to data on the server. In other words, based on the information about the access to the data on the server, the server may determine the preset number of pieces of data that are frequently accessed among the data therein. The server may distinguish the preset number of pieces of frequently accessed data from the data therein using the reference counts.

Figure 19:
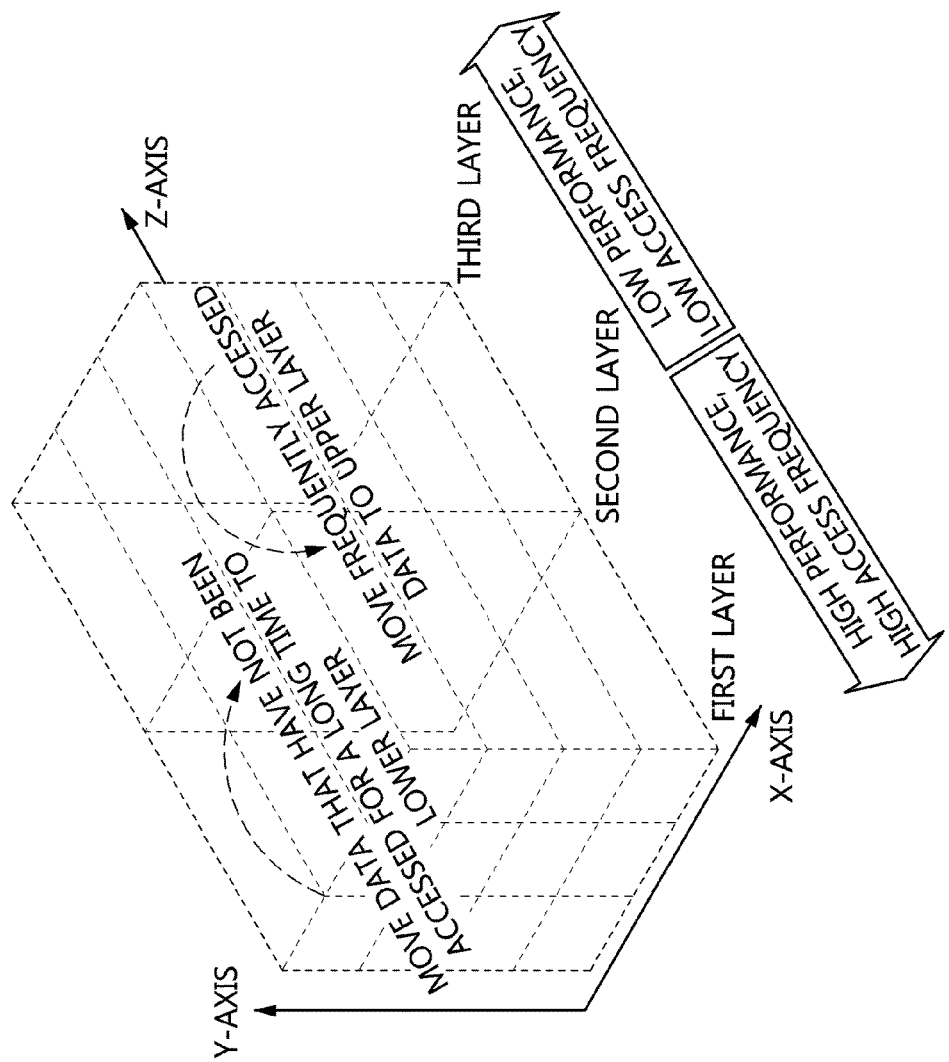
FIG. 19 describes moving data based on the change of a user's access pattern according to an example.

FIG. 19 describes the movement of data depending on the change in a user's access pattern according to an example.

According to the embodiment described with reference to FIG. 5B, the distributed file system 200 may arrange recently created data such that they are closer to the public network 299 than data that was created long ago. The frequently accessed data may be arranged to be closer to the public network 299, and may be accessed with high performance. The infrequently accessed data may be arranged to be further from the public network 299, and may be accessed with low performance. In other words, a server group or a layer may be arranged in the forward direction based on the Z-axis (that is, to be close to the public network 299) depending on the time at which the server group or the layer is added. Therefore, recently created data may be located to be close to the public network 299, and may be accessed more quickly.

Meanwhile, even if data were created long ago, the data may be frequently accessed during a predetermined time according to a user's access pattern. Also, even some data that were recently created may not be accessed for a long time.

In order to respond to a user's access pattern, the distributed file system 200 may move the data that are accessed more frequently than other data according to the user's access pattern, to the layer or server located in front of the layer or server in which the corresponding data are currently stored, based on the Z-axis. In other words, the distributed file system 200 may move data that are accessed more frequently than other data such that they are closer to the public network 299. This movement enables data to be transferred at high speed.

In order to respond to a user's access pattern, the distributed file system 200 may adjust the location of predetermined data therein along the first axis based on the frequency with which the predetermined data are accessed. Here, the first axis may be the Z-axis. The first axis may be an axis corresponding to the distance from the public network.

The distributed file system 200 may move data that are accessed less frequently than other data, according to a user's access pattern, to the layer or server located behind the layer or server in which the corresponding data are currently stored, based on the Z-axis. In other words, the distributed file system 200 may move the data that are accessed less frequently than other data further from the public network 299. This movement enables more frequently accessed data to be transferred at high speed.

In FIG. 19, the lower layer may be a layer that is further from the public network 299, and the upper layer may be a layer that is closer to the public network 299.

As described above, a torus network may be used more effectively by changing the Z-coordinate of data.

In order to respond to a user's access pattern, the statistical information and reference counts, described above with reference to FIG. 18, may be used. The statistical information and the reference counts may represent the frequency with which each piece of data in the layer is accessed. Alternatively, the statistical information and the reference counts may represent the frequency with which each piece of data in a server is accessed.

Also, in order to respond to a user's access pattern, the time at which data were most recently accessed may be used. For example, the layer master may collect the times at which data were most recently accessed for each piece of data in the layer. Alternatively, the server may collect the times at which data were most recently accessed for each piece of data on the server. The distributed file system 200 may move the data based on the time at which the data were most recently accessed.

The distributed file system 200 may move data that have not been accessed for a predetermined time to a layer or server located behind the layer or server in which the corresponding data are currently stored, based on the Z-axis.

The layers of the distributed file system 200 may have a timeout value for each of the layers. For the data in each layer, the distributed file system 200 may move the data that have not been accessed for a time corresponding to the timeout value to the layer or server located behind the layer or server in which the corresponding data are currently stored. Alternatively, the distributed file system 200 may provide lower bandwidth to the data that have not been accessed for a time, determined based on the timeout value.

Figure 20:
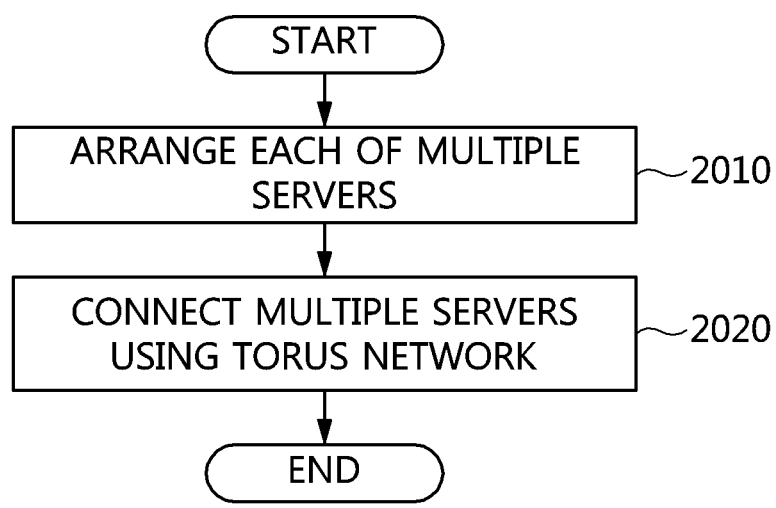
FIG. 20 is a flowchart of a method for configuring a distributed file system according to an embodiment.

FIG. 20 is a flowchart of a method for configuring a distributed file system according to an embodiment.

At step 2010, multiple servers may be arranged based on n-dimensional axes.

At step 2020, the multiple servers may be connected to each other through the n-dimensional torus network.

Figure 21:
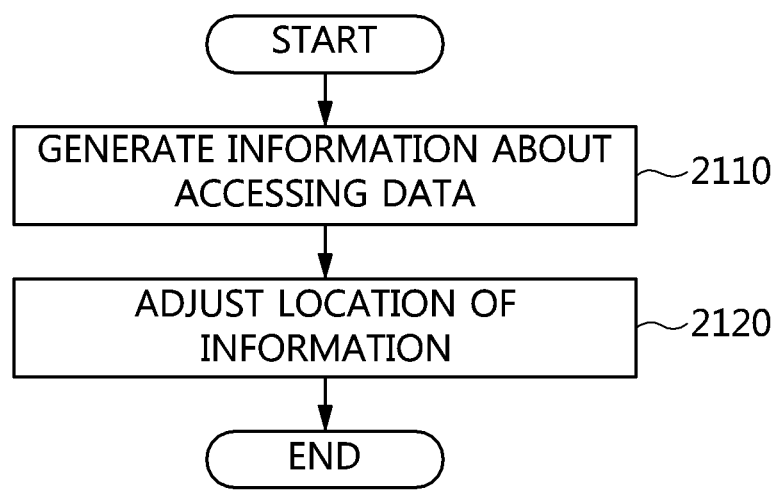
FIG. 21 is a flowchart of a method for operating a distributed file system according to an embodiment.

FIG. 21 is a flowchart of a method for operating a distributed file system according to an embodiment.

The distributed file system 200 may include multiple servers that are connected with each other through the n-dimensional torus network.

At step 2110, information about the access to predetermined data of the distributed file system 200 may be generated.

At step 2120, based on the generated information about the access, the location of the predetermined data may be adjusted on the first axis.

The first axis may be the Z-axis. The first axis may be an axis corresponding to the distance from the public network 299.

In the above-described embodiment, the function or operation performed by the distributed file system 200 may be regarded as being performed by the management server, among the multiple servers in the distributed file system 200. The management server may be a server that is selected according to a predetermined criterion from among the multiple servers in the distributed file system 200. The management server may be the above-mentioned overall master. Alternatively, the management server may be a layer master, selected according to a predetermined criterion from among the layer masters in the distributed file system 200. For example, the management server may be a server in a predefined absolute location or a server in a predetermined relative location, among the multiple servers in the distributed file system 200.

The device described herein may be implemented using hardware components, software components, or a combination thereof. For example, the device and components described in the embodiments may be implemented using one or more general-purpose or special purpose computers, for example, a processor, a controller, an arithmetic logic unit (ALU), a digital signal processor, a microcomputer, a field programmable array (FPA), a programmable logic unit (PLU), a microprocessor or any other device capable of responding to and executing instructions. The processing device may run an operating system (OS) and one or more software applications that run on the OS. The processing device may also access, store, manipulate, process, and create data in response to execution of the software. For convenience of understanding, the use of a single processing device is described, but those skilled in the art will understand that a processing device may comprise multiple processing elements and multiple types of processing elements. For example, a processing device may include multiple processors or a single processor and a single controller. Also, different processing configurations, such as parallel processors, are possible.

The software may include a computer program, code, an instruction, or some combination thereof, and it is possible to configure processing devices or to independently or collectively instruct the processing devices to operate as desired. Software and data may be embodied permanently or temporarily in any type of a machine, a component, physical or virtual equipment, a computer storage medium, a device, or in a propagated signal wave in order to provide instructions or data to the processing devices or to be interpreted by the processing devices. The software also may be distributed in computer systems over a network so that the software is stored and executed in a distributed method. In particular, the software and data may be stored in one or more computer readable recording media.

The above-described embodiments may be implemented as a program that can be executed by various computer means. In this case, the program may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

In consideration of the characteristics of a large-scale distributed file system, a method for configuring data servers in a torus network is provided.

A method for constructing a data server and adding data servers at the lowest network construction cost is provided.

A method for arranging data servers in a torus network depending on whether priority is given to performance or storage space is provided.

Through a method for arranging data, a method for improving network efficiency using given resources is provided.

Though a method for arranging data servers, a method for improving network efficiency is provided.

A method for rearranging workloads on multiple paths of a torus network is provided.

In consideration of the characteristics of a torus network, a method for arranging loads on data servers is provided.

A distributed file system based on a torus network configured using the above-mentioned methods is provided.

Although the preferred embodiments of the present invention have been disclosed for illustrative purposes, those skilled in the art will appreciate that various modifications, additions and substitutions are possible. For example, suitable results may be achieved if the described techniques are performed in a different order and/or if components in a described system, architecture, device, or circuit are combined in a different manner and/or replaced or supplemented by other components or their equivalents.

What is claimed is:

1. A distributed file system, comprising
multiple servers, wherein the multiple servers are connected with each other through an n-dimensional torus network;
each of the multiple servers is arranged based on n-dimensional axes,
a data service load of the distributed file system is distributed along a first axis among the axes,
the first axis is an axis corresponding to a distance from a public network, and
the distributed file system preferentially allocates a data space of a server that is closest to the public network among the servers in response to a request to allocate a data space for data service.

2. The distributed file system of claim 1, wherein n is 3.

3. The distributed file system of claim 1, wherein in configuring the distributed file system, a first configured server group of an (n−1)-dimensional torus network is connected to a public network.

4. The distributed file system of claim 3, wherein in configuring the distributed file system, a server group of the multiple servers of the (n−1)-dimensional torus network is sequentially connected to an existing configured network in a direction manner that is disposed away from the public network.

5. The distributed file system of claim 1, wherein when servers of an (n−1)-dimensional torus network are added in order to expand the distributed file system, the servers of the (n−1)-dimensional torus network are arranged on a first axis of the axes and are arranged at a location that is closest to a public network on the first axis, wherein the first axis is an axis corresponding to a distance from the public network.

6. The distributed file system of claim 1, wherein statistical information about the servers is collected in an (n−1)-dimensional unit based on a first axis, wherein the first axis is an axis corresponding to a distance from a public network.

7. The distributed file system of claim 6, wherein an (n−1)-dimensional master collects the statistical information for each of (n−1)-dimensional networks on the first axis, and an n-dimensional master collects the collected statistical information about the (n−1)-dimensional networks.

8. The distributed file system of claim 1, wherein different loads of the distributed file system are distributed based on the axes.

9. The distributed file system of claim 1, wherein an internal load of the distributed file system is distributed among remaining axes, excluding the first axis from the axes.

10. The distributed file system of claim 1, wherein a data replication load of the distributed file system is distributed along a second axis, wherein the second axis is one of remaining axes, excluding the first axis from the axes.

11. The distributed file system of claim 1, wherein the distributed file system determines a server, in which data space is to be allocated for replicating original data, using a turnaround method in a direction from a location close to a server that stores the original data to a location distant from the server that stores the original data, in response to a request to allocate a data space for data replication.

12. The distributed file system of claim 1, wherein a striping load of the distributed file system is distributed along a third axis, wherein the third axis is one of remaining axes, excluding the first axis from the axes.

13. The distributed file system of claim 12, wherein:
the distributed file system allocates data spaces of multiple servers for striping;
the distributed file system selects a first server, in which a first data space of the data spaces is to be allocated, from among the servers; and
the distributed file system selects a server, in which a remaining data space of the data spaces is to be allocated, from among the servers along the third axis in a direction from a location close to the first server to a location distant from the first server.

14. The distributed file system of claim 1, wherein when multiple servers for storing striped data process a request to write data to be striped, each of the multiple servers for storing striped data transfers a request to write remaining data, excluding data to be processed by each of the multiple servers, to a server subsequent thereto in response to the request to write data to be striped, and a last server of the multiple servers for storing striped data generates a completion message when completing the request to write data to be striped, wherein the completion message is transferred in a direction that is opposite to a direction in which the request to write data to be striped is transferred.

15. The distributed file system of claim 1, wherein when multiple servers for storing striped data process a request to read striped data, each of the multiple servers transfers the request to read striped data to a server subsequent thereto, and data, read by the multiple servers in response to the request to read striped data, are combined and transferred in a direction that is opposite to a direction in which the request to read striped data is transferred.

16. The distributed file system of claim 1, wherein the distributed file system adjusts a location of predetermined data of the distributed file system on a first axis based on a frequency with which the predetermined data are accessed, wherein the first axis is an axis corresponding to a distance from a public network.

17. A method for configuring a distributed file system, comprising:
arranging each of multiple servers based on n-dimensional axes; and
connecting the multiple servers with each other through an n-dimensional torus network, wherein
a data service load of the distributed file system is distributed along a first axis among the axes,
the first axis is an axis corresponding to a distance from a public network, and
a data replication load or a striping load of the distributed file system is distributed along a second axis, wherein the second axis is one of remaining axes, excluding the first axis from the axes.

18. A method for configuring a distributed file system that includes multiple servers connected with each other through an n-dimensional torus network along at least a first axis, the method comprising:
generating information about access to predetermined data of the distributed file system; and
adjusting a location of the predetermined data on the first axis based on the information, wherein the first axis is an axis corresponding to a distance from a public network.

* * * * *